US011111330B2

(12) United States Patent
Guan et al.

(10) Patent No.: US 11,111,330 B2
(45) Date of Patent: Sep. 7, 2021

(54) SYNTHESIS OF MULTIPHASE SELF-HEALING POLYMERS FROM COMMODITY MONOMERS

(71) Applicant: The Regents of the University of California, Oakland, CA (US)

(72) Inventors: Zhibin Guan, Irvine, CA (US); Aaron M. Kushner, Solana Beach, CA (US)

(73) Assignee: The Regents of the University of California, Oakland, CA (US)

(*) Notice: Subject to any disclaimer, the term of this patent is extended or adjusted under 35 U.S.C. 154(b) by 551 days.

(21) Appl. No.: 15/736,210

(22) PCT Filed: Jun. 20, 2016

(86) PCT No.: PCT/US2016/039423
§ 371 (c)(1),
(2) Date: Dec. 13, 2017

(87) PCT Pub. No.: WO2017/034660
PCT Pub. Date: Mar. 2, 2017

(65) Prior Publication Data
US 2018/0171055 A1  Jun. 21, 2018

Related U.S. Application Data
(60) Provisional application No. 62/183,975, filed on Jun. 24, 2015.

(51) Int. Cl.
*C08F 293/00* (2006.01)
*C08F 257/02* (2006.01)
(52) U.S. Cl.
CPC ........ *C08F 293/005* (2013.01); *C08F 257/02* (2013.01); *C08F 2438/03* (2013.01)
(58) Field of Classification Search
CPC ............... C08F 257/02; C08F 293/005; C08F 2438/03
See application file for complete search history.

(56) References Cited

U.S. PATENT DOCUMENTS

2014/0375934 A1* 12/2014 Kim .................. G02F 1/133528
349/96

FOREIGN PATENT DOCUMENTS

CN        104211850 A1 * 12/2014
WO    WO2012/084737 A1    6/2012

OTHER PUBLICATIONS

Iatradi, Z. et al. Polymer Chemistry vol. 6 pp. 3942-3955 (Apr. 13, 2015) (Year: 2015).*
Murphy, E. B.; Wudl, F. Prog. Polym. Sci. 2010, 35, 223.
Yang, Y.; Urban, M. W. Chem. Soc. Rev. 2013, 42, 7446.
Dry, C. Compos. Struct. 1996, 35, 263.
Cho, S. H.; Andersson, H. M.; White, S. R.; Sottos, N. R.; Braun, P. V. Adv. Mater, 2006, 18, 997.
White, S. R.; Sottos, N. R.; Geubelle, P. H.; Moore, J. S. Kessler, M. R.; Sriram, S. R.; Brown, E. N.; Viswanathan, S. Nature 2001, 409, 794.
Toohey, K. S.; Sottos, N. R.; Lewis, J. A.; Moore, J. S.; White, S. R. Nat. Mater. 2007; 6, 581.
White, S. R.; Moore, J. S.; Sottos, N. R.; Krull, B. P.; Santa Cruz, W. A.; Gergely, R. C. R. Science 2014, 344; 620.
Kirkby, E. L.; Rule, J. D.; Michaud, V. J.; Sottos; N. R.; White, S. R.; Manson, J.-A. E. Adv. Funct. Mater. 2008, 18, 2253.
Lu, Y.-X.; Guan, Z. J. Am. Chem. Soc. 2012, 134, 14226.
Canadell, J.; Goossens, H.; Klumperman, B. Macromolecules 2011, 44, 2536.
Amamoto, Y.; Otsuka, H.; Takahara, A.; Matyjaszewski, K. Adv. Mater. 2012; 24, 3975.
Zheng, P.; McCarthy, T. J. J. Am. Chem. Soc. 2012, 134, 2024.
He, L.; Fullenkamp, D. E.; Rivera, J. G.; Messersmith, P. B. Chem. Commun. 2011, 47, 7497.
Chen, X.; Dam, M. A.; Ono, K.; Mal, A.; Shen, H.; Nut, S. R.; Sheran, K.; Wudl, F. Science 2002, 295, 1698.
Herbst, F.; Doehler, D.; Michael, P.; Binder, W. H. Macromol. Rapid Commun. 2013, 34, 203.
Burnworth, M.; Tang, L.; Kumpfer, J. R.; Duncan, A. J.; Beyer, F. L.; Fiore, G. L.; Rowan, S. J.; Weder, C. Nature 2011, 472, 334.
Bode, S.; Zedler, L.; Schacher, F. H.; Dietzek, B.; Schmitt, M.; Popp, J.; Hanger, M. D.; Schubert, U. S. Adv. Mater. 2013, 25, 1634.
Nakahata, M.; Takashima, Y.; Yamaguchi, H.; Harada, A. Nat. Commun. 2011, 2, 1521/1.
Burattini, S.; Greenland, B. W.; Merino, D. H.; Weng, W.; Seppala, J.; Colquhoun, H. M.; Hayes, W.; Mackay, M. E.; Hamley, I. W.; Rowan, S. J. J. Am. Chem. Soc. 2010, 132, 12051.
Kalista, S. J., Jr.; Ward, T. C.; Oyetunji, Z. Mech. Adv. Mater. Struct. 2007, 14, 391.
Cordier, P.; Tournilhac, F.; Soulie-Ziakovic, C.; Leibler, L. Nature 2008, 451, 977.
Aida, T.; Meijer, E. W.; Stupp, S. I. Science 2012, 335, 813.
Hentschel, J.; Kushner, A. M.; Ziller, J.; Guan, Z. Angew, Chem., Int. Ed. 2012, 51, 10561.
Mozhdehi, D.; Ayala, S.; Cromwell, O. R.; Guan, Z. J. Am. Chem. Soc. 2014, 136, 16128.
Chen, Y.; Kushner, A. M.; Williams, G. A.; Guan, Z. Nat. Chem. 2012, 4, 467.
Moad, G.; Rizzardo, E.; Thang, S. H. Aust. J. Chem. 2009, 62, 1402.

(Continued)

*Primary Examiner* — Irina S Zemel
*Assistant Examiner* — Jeffrey S Lenihan
(74) *Attorney, Agent, or Firm* — Brooks Kushman P.C.

(57) ABSTRACT

A self-healing polymer material that includes a multiphase copolymer, and a method of making the copolymer, are provided. The multiphase copolymer includes one or more hydrogen bond-forming copolymer segments, each segment including a polymerized acrylamide monomer and a polymerized acrylic monomer. The polymerized acrylamide monomer includes functional groups that form hydrogen bonds in the multiphase copolymer, and is present in the one or more copolymer segments in an amount sufficient for self-healing of the multiphase copolymer.

12 Claims, 17 Drawing Sheets

(56) References Cited

OTHER PUBLICATIONS

Takahiro Kakuta, et al., "Prearganized Hydrogel: Self-Healing Properties of Supramolecular Hydrogels Formed by Polymerization of Host-Guest-Monomers that Contain Cyclodextrins and Hydrophobic Guest Groups", Advanced Materials, vol. 25, No. 20, May 28, 2013, pp. 2849-2853.

Ros Azlinawati Ramli, et al., "Synthesis, characterization, and morphology study of poly(acrylamide-co-acrylic acid)-grafted-poly(styrene-co-methyl methacrylate) "raspberry"-shape like structure microgels by pre-emulsified semi-batch emulsion polymerization", Analytical Sciences, vol. 391, Feb. 1, 2013, pp. 86-94.

PCT Search Report and Written Opinion dated Feb. 9, 2017 in connection with related PCT Application No. PCT/US2016/039423.

* cited by examiner

Scheme 1

Synthesis of BAAM copolymers. Conditions a) AIBN, toluene, 75 °C; b) Potassium ethyl trithiocarbonate (KSCS$_2$Et), acetone; c) BA, AM, AIBN, DMF, 55 °C. AIBN = azobisisobutyronitrile, BA = n-butyl acrylate, AM = acrylamide, DMF = dimethylformamide.

SYNTHESIS OF MULTIPHASE SELF-HEALING POLYMERS FROM COMMODITY MONOMERS

CROSS-REFERENCE TO RELATED APPLICATIONS

This application is the U.S. national phase of PCT Application No. PCT/US2016/039423 filed Jun. 20, 2016 which claims the benefit of Provisional Patent Application No. 62/183,975, filed on Jun. 24, 2015, the disclosures of which are hereby incorporated in their entirety by reference herein.

STATEMENT REGARDING FEDERALLY SPONSORED RESEARCH OR DEVELOPMENT

This invention was made with Government support under Grant No. DE-FG02-04ER46162. from the Department of Energy. The Government has certain rights in this invention.

BACKGROUND

Field of the Invention

The invention relates to polymers and methods of polymer synthesis.

Related Art

Progress toward inexpensive, strong, and tunable self-healing materials will significantly accelerate their adoption into commercial applications. This area of research has been under intense investigation and many strategies for the design of self-healing materials have emerged recently [1,2]. One self-healing approach is to store the reactive healing agents in the material [3-5] or delivering them via vasculature network to the damage site [6,7]. Programmed shape memory transitions are investigated to physically close the damaged gap and facilitate polymer diffusion across the cut interfaces and subsequent healing [8]. Additionally, significant efforts have been directed at the discovery of new intrinsically self-healing polymers to design materials that can efficiently repair themselves after multiple cycles of damage. During the last decade, many new covalent bonds (i.e. metathesis of double bonds [9], disulfide bond exchange [10], thiuram disulfide [11], siloxane exchange [12], exchange of catechol-based boronic ester [13], Diels-Alder reaction [14], and etc.) and non-covalent interactions [15] have been explored as dynamic motif. Supramolecular interactions, such as metal-ligand 16,17], host-guest [18], π-π stacking [19], ionic [20], hydrogen bonds [21] and etc., have been also a subject of intensive investigation since the broad tunability of their kinetic and thermodynamic parameters can be productively utilized to control mechanical and self-healing properties [22].

Over the past few years, the inventors laboratory contributed to the development of self-healing systems utilizing dynamic interactions [9,23-25]. The inventors demonstrated that a multiphasic copolymer that phase separates into glassy domains with high glass transition temperature ($T_g$) embedded in a matrix of dynamic non-covalent interactions, H-bond or metal-ligand interactions, with high mobility is a promising route to combine efficient self-healing and strong mechanical properties. This multiphase approach overcame one major obstacle to realizing the wide spread use of self-healing polymers utilizing non covalent, dynamic interactions. By introducing a discontinuous glassy hard phase (to improve stiffness and yield strength) covalently connected to a continuous soft phase bearing a robust network of dynamic motifs, the inherent trade-off between stiff low-strain mechanical response and stimulus-free dynamic self-healing was circumvented to effect nearly quantitative self-healing after catastrophic macroscopic damage.

SUMMARY

Many previously reported self-healing materials require custom designed monomers and polymers, making them economically unfeasible for large-scale manufacturing and practical applications. To move the field forward, it is critical to devise a practical and scalable synthesis to access self-healing polymers with robust properties.

In one aspect, a self-healing polymer material is provided. The polymer material includes a multiphase copolymer that includes one or more hydrogen bond-forming copolymer segments, with each copolymer segment including a polymerized acrylamide monomer and a polymerized acrylic monomer. The polymerized acrylamide monomer of the one or more copolymer segments includes functional groups that form hydrogen bonds in the multiphase copolymer, and the polymerized acrylamide monomer is present in the one or more copolymer segments in an amount sufficient for self-healing of the multiphase copolymer. In some embodiments, the copolymer segments can be random copolymers of the polymerized acrylamide and acrylic monomers.

The multiphase copolymer can be a linear copolymer in some embodiments, or can be a branched copolymer in some embodiments. The branched copolymer can be a graft or brush copolymer that includes the one or more copolymer segments attached to a polymer backbone, or can be a star copolymer that includes the one or more copolymer segments attached to a core. As either a linear or branched copolymer, the multiphase copolymer can include polymerized styrenic or acrylic monomer segments forming glassy domains in the multiphase copolymer. A linear copolymer can include the glassy domains in one or more blocks, and can include the one or more hydrogen bond-forming copolymer segments in one or more additional blocks.

In another aspect, a method of preparing a self-healing multiphase copolymer is provided. The method includes connecting one or more hydrogen bond-forming copolymer segments to a polymer segment by polymerization, with each copolymer segment including a polymerized acrylamide monomer and a polymerized acrylic monomer. The polymerized acrylamide monomer of the one or more copolymer segments includes functional groups that form hydrogen bonds in the multiphase copolymer, and the polymerized acrylamide monomer is present in the one or more copolymer segments in an amount sufficient for self-healing of the multiphase copolymer. In some embodiments, the copolymer segments can be random copolymers of the polymerized acrylamide and acrylic monomers.

In the method: a) the polymer segment can include polymerized styrenic or acrylic monomer segments forming glassy domains in the multiphase copolymer; b) the multiphase copolymer can be a linear copolymer or a branched copolymer; or c) any combination of a) and b).

In the method, as a branched copolymer, the multiphase copolymer can be a graft or brush copolymer, or a star copolymer. When the multiphase copolymer is a graft or brush copolymer, the connecting of the one or more hydrogen bond-forming copolymer segments to the polymer segment by polymerization can include: preparing a polymer chain having pendant groups by polymerization of a combination of styrenic monomers; covalently reacting the pendant groups of the polymer chain to a trithiocarbonate reversible addition fragmentation chain transfer (RAFT) agent to produce a backbone polymer chain comprising trithiocarbonyl groups, where the polymer segment forms at least a part of the backbone polymer chain and includes the trithiocarbonyl groups; and performing RAFT polymerization with the backbone polymer chain to connect the one or more copolymer segments to the polymer segment.

Other features of the self-healing polymer material and the method of preparing a self-healing multiphase copolymer are described below.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
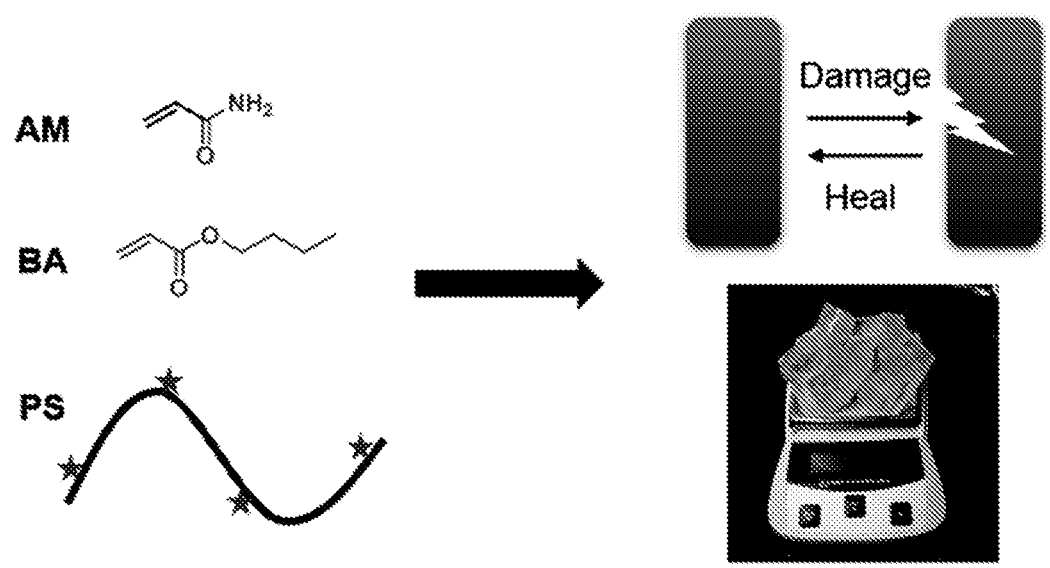
FIG. 1 is a schematic of modular multiphasic self-healing materials from inexpensive commercially available monomers. Acrylamide monomer (AM) is used as the dynamic H-bond motif and $T_g$ is controlled by the incorporation of n-butyl acrylate (BA). The modular synthesis is scalable and provides an affordable way to synthesize tunable and strong self-healing polymers.

In embodiments of the self-healing polymer material and the method of preparing a self-healing multiphase copolymer:

A) The styrenic monomer can be styrene; an alkylstyrene, such as α-methyl styrene, 2-methyl styrene, 3-methyl styrene, 4-methyl styrene, 4-propyl styrene, 4-cyclohexylstyrene and 4-dodecylstyrene; an arylstyrene, such as 2-ethyl-4-benzyl styrene, 4-(phenylbutyl)styrene, 1-vinylnaphthalene and 2-vinylnaphthalene; a halogenated styrene; an alkoxystyrene; a vinylbenzoate ester; or any combination thereof.

B) The acrylic monomer of the polymerized acrylic monomer segments and the polymer segment can be a methacrylate monomer or an acrylate monomer, or a combination thereof. In particular, the acrylic monomer can be an α,β-ethylenically unsaturated carboxylic acid ester having from 1 to 20, or 1 to 12, or 1 to 8, or 1 to 4, carbon atoms in the ester group. Specific examples of esters of such unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, cyclohexyl methacrylate, dicyclopentanyl methacrylate, benzyl methacrylate, isobornyl methacrylate, and mixtures of two or more thereof. In particular embodiments, comonomers can be selected from methyl acrylate, methyl methacrylate, ethyl acrylate, ethyl methacrylate, n-butyl acrylate, n-butyl methacrylate, isobutyl acrylate, isobutyl methacrylate, vinyl acetate, and mixtures of two or more thereof.

C) The acrylamide monomer can be acrylamide, (meth) acrylamide, ethyl hexyl (meth)acrylamide, diethylaminopropyl (meth)acrylamide, dimethylaminohydroxypropyl (meth)acrylamide, N-isopropyl (meth)acrylamide, N-tert-butyl (meth)acrylamide, a $C_1$-$C_{10}$ N-alkyl acrylamide, a $C_1$-$C_{10}$ N-alkyl methacrylamide, N-aryl acrylamide, or N-aryl methacrylamide, or a combination thereof.

D) The acrylic monomer of the hydrogen bond-forming copolymer segments can be a methacrylate monomer or an acrylate monomer, or a combination thereof. In particular, the acrylic monomer can be an α,β-ethylenically unsaturated carboxylic acid ester having from 1 to 20, or 1 to 12, or 1 to 8, or 1 to 4, carbon atoms in the ester group. Specific examples of esters of such unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, cyclohexyl methacrylate, dicyclopentanyl methacrylate, benzyl methacrylate, isobornyl methacrylate, 2-methoxyethyl acrylate, 2-methoxyethyl methacrylate, dimethylaminoethyl acrylate, dimethylaminoethyl methacrylate, tetrahydrofurfryl acrylate, tetrahydrofurfryl methacrylate, isodecyl acrylate, isodecyl methacrylate, stearyl acrylate n-stearyl methacrylate, 2-hydroxymethyl acrylate, 2-hydroxymethyl methacrylate, 2-hydroxypropyl acrylate, 2-hydroxypropyl methacrylate, and mixtures of two or more thereof. In particular embodiments, comonomers can be selected from methyl acrylate, methyl methacrylate, ethyl acrylate, ethyl methacrylate, n-butyl acrylate, n-butyl methacrylate, isobutyl acrylate, isobutyl methacrylate, vinyl acetate, and mixtures of two or more thereof.

E) In the method, when the multiphase copolymer is a graft or brush copolymer, the styrenic monomer combination can be a styrenic monomer and a halogen-functionalized styrenic monomer. The styrenic monomer can be styrene; an alkylstyrene, such as α-methylstyrene, 2-methyl styrene, 3-methyl styrene, 4-methyl styrene, 4-propyl styrene, 4-cyclohexylstyrene and 4-dodecylstyrene; an arylstyrene, such as 2-ethyl-4-benzyl styrene, 4-(phenylbutyl)styrene, 1-vinylnaphthalene and 2-vinylnaphthalene; an alkoxystyrene; a vinylbenzoate ester; or any combination thereof. The halogen-functionalized styrenic monomer can be 4-vinylbenzyl chloride, 4-vinylbenzyl bromide, or 4-vinylbenzyl iodide, or a combination thereof. Also, the RAFT agent can be a trithiocabonate such as potassium ethyl trithiocarbonate and the like.

In general, a self-healing polymer material contains a "hard" phase, which is an amorphous or crystalline assembly of oligomers or polymers that possesses a melting temperature ($T_m$) or glass transition temperature ($T_g$) that is higher than the intended or preselected operating temperature of use, and contains a "soft" phase comprising a linear, branched, hyper-branched, or dendritic polymeric scaffold containing dynamically-interacting motifs (DIMs), with a $T_g$ that is lower than the intended or preselected operating temperature of use. In particular aspects, the DIMs can be mono-dentate or multi-dentate hydrogen bonding groups such as hydroxyl, amide, or urea, and in particular, a hydrogen bonding amide.

In some cases, the hard phase can be derived from a relatively high $T_m$ or $T_g$ polymer, which assembles into a spherical, cylindrical, or other microstructure upon processing, and the soft phase comprises copolymers containing a single DIM, or copolymers of different DIMs. In particular embodiments, the single DIM is a hydrogen bonding amide.

In general, multiphasic polymers can be assembled by: a) Synthesizing or acquiring an oligomer or polymer/copolymer having a relatively high $T_m$ or $T_g$, which will serve as the hard phase and presents any form of latent reactive functionality, to enable connection to the soft phase polymer. A relatively high $T_m$ or $T_g$ is a $T_m$ or $T_g$ above the intended or preselected operating temperature of use for the material. The term "latent reactive functionality" means a chemical structure designed to react during the grafting process, but is able to survive and does not interfere with polymer synthesis. b) Synthesizing or acquiring oligomeric or polymeric macromolecules, either grown directly from the hard phase polymer, or pre-synthesized then attached to the hard phase in the grafting process, which are comprised fully or partially of monomers bearing any of the dynamically-interacting motifs described herein, according to procedures known to those skilled in the art. The grafts may be attached chemically (covalently attached; examples including but not limited to polymerization initiators such as, but are not limited to, either "living" or "free-radical" initiators chain transfer agents, or latent "click" functionality) or physically (non-covalently; attached examples including but not limited to the DIM functionality described herein) connected to end(s) and/or backbone of the polymer or the synthesized or chosen in a). c) Processing the material obtained in b) by any process known in the art, such as but not limited to, casting, molding, injection, spinning, melt extrusion, or additive manufacturing techniques. This results in the desired multiphase material.

The multiphase material can contain one or more additives such as antioxidizing agents, UV stabilizers, flame retardants, lubricants, reinforcing agents, extenders, and the like.

A self-healing multiphase graft or brush copolymer containing a polystyrenic main chain can be prepared as follows: A styrenic polymer backbone is prepared by either free radical or one of the living/controlled radical polymerization method. Either atom transfer radical polymerization (ATRP) or RAFT initiator will be introduced to the backbone either through copolymerization of a functional monomer or post-polymerization modification. Using the functional polystyrenic backbone as the macro-initiator, hydrogen bonding grafts or brushes will be formed by copolymerization of at least one hydrogen bonding monomer with other comonomers via ATRP or RAFT or any other radical polymerization methods.

A self-healing multiphase graft or brush copolymer containing a polyacrylic main chain can be prepared as follows: A polyacrylic main chain can be prepared by either free radical or one of the living/controlled radical polymerization method. Either ATRP or RAFT initiator can be introduced to the backbone either through copolymerization of a functional monomer or post-polymerization modification. Using the functional polyacrylic main chain as the macro-initiator, hydrogen bonding grafts or brushes can be formed by copolymerization of at least one hydrogen bonding monomer with other comonomers via ATRP or RAFT or any other radical polymerization methods. For example, a polymer chain having pendant groups can be prepared by polymerization of a combination of acrylic monomers with terminal halogenated methacrylate (for example, 2-(2-bromoisobutyryloxy)ethyl methacrylate) to produce a macroinitiator comprising halogen atoms in the side chains. In the presence of the macroinitiator, ATRP polymerization of monomers comprising a acrylamide monomer and acrylic monomer cab be performed to produce a graft or brush copolymer A self-healing star copolymer can be prepared as follows: Using either a small molecule or macromolecular multi-arm functional initiator, hydrogen bonding grafts or brushes can be formed by copolymerization of at least one hydrogen bonding monomer with other comonomers via ATRP or RAFT or any other radical polymerization methods. For example, ATRP can be performed to prepare a diblock polymer comprising a polymer segment having a polymerized acrylamide monomer and a polymerized acrylic monomer, and a polymer segment having a styrene or acrylic block, followed by a coupling reaction with a controlled amount of a coupling agent such as diacrylates.

A self-healing multiphase linear copolymer can be prepared as follows: Using either a small molecule or macromolecular initiator, hydrogen bonding containing linear polymers can be formed by copolymerization of at least one hydrogen bonding monomer with other comonomers via ATRP or RAFT or any other radical polymerization methods. For example, to prepare a linear block copolymer by ATRP, a bifunctional initiator, (e.g., ethylene glycol bis(2-bromoisobutyrate)) can be used to first polymerize monomers comprising a styrene or acrylic monomer to form a glassy, telechelic polymer block. Using the telechelic polymer as a macroinitiator, subsequent ATRP of monomers comprising an acrylamide monomer and an acrylic monomer can grow two soft polymer blocks to form ABA type triblock copolymers. By choosing the initiator or by changing the polymerization sequence, diblock, triblock, or multiblock linear copolymers can be prepared.

A method of synthesizing self-healing multiphase copolymer by ATRP is: ATRP polymerization can be carried out similarly to RAFT, except that the initiation motifs are the common ones being developed for ATRP.

The present invention may be better understood by referring to the accompanying examples, which are intended for illustration purposes only and should not in any sense be construed as limiting the scope of the invention.

Example 1

We developed an easy and scalable synthesis of strong self-healing materials with tunable mechanical properties by using simple commercially available building blocks. Specifically, we have adopted a brush copolymer architecture we used previously [25], in which a glassy polystyrene backbone (PS) backbone was grafted with multiple brushes containing multivalent hydrogen bonding sites. We employed a simple commodity monomer, acrylamide monomer (AM), as the hydrogen bonding building block, because of its robust hydrogen bonding capability and low cost. In order to maintain dynamics in the continuous soft phase for spontaneous healing under mild conditions, we copolymerized AM with another inexpensive commodity monomer, n-butyl acrylate (BA) for the brush synthesis (FIG. 1).

Figure 2:
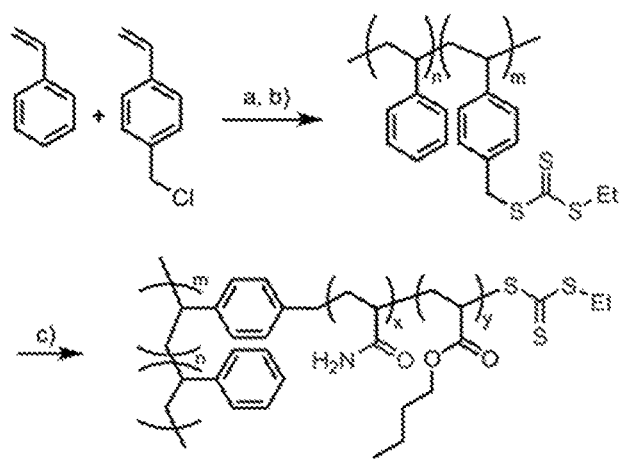
FIG. 2 is a scheme for the synthesis of BAAM copolymers.

We adapted our previous synthesis to obtain a scalable protocol for the synthesis of brush copolymers containing BA and AM, hence referred to as BAAM, covalently connected to a polystyrene domain at one end (FIG. 2, Scheme 1). The polystyrene backbone, which phase-separates into stiff glassy nano-domains in the final bulk structure, was synthesized via free radical polymerization of styrene and 4-vinylbenzyl chloride, followed by substitution by trithiocarbonate to yield macro-chain transfer agents, mCTAs. For this study, we prepared 3 different backbones with an approximate length of 140 repeat units and different density of chain transfer agents (5, 10 and 15 mol %, corresponding to 7, 14, and 21 brushes per backbone), to test whether changes in graft density, which likely affect the dynamics of phase separation and self-assembly of the glassy styrene domains, can be used as an effective structure/property design handle.

From this series of mCTAs we grew BAAM brush copolymers of independently varying brush length and composition to probe the effects of changing hard-phase volume fraction and soft-phase glass transition temperature on the mechanical properties of the resulting brush copolymers. We chose reversible addition fragmentation chain transfer polymerization (RAFT) as a living/controlled radical polymerization method for the brush synthesis [26]. All intermediates and products could be effectively isolated and purified using simple precipitation technique, which reduces the cost of synthesis and makes it easy to scale up. The details of synthetic protocols, characterization, and full brush copolymer study series are reported in Example 2.

Following this simple, robust protocol, we synthesized a series of BAAM brush copolymers to investigate the tunability of the new system. Table 1 summarizes the molecular compositions of the BAAM brush copolymers and a control polymer (which lacks the polystyrene backbone) prepared for this study.

TABLE 1

Molecular parameters of BAAM copolymer system.

| Polymer | Graft Density[a] | # of repeat units on each brush[b] | AM mol %[b] |
|---|---|---|---|
| BAAM-1 | 5 | 270 | 16% |
| BAAM-2 | 5 | 250 | 22% |
| BAAM-3 | 5 | 290 | 30% |
| BAAM-4 | 5 | 84 | 24% |
| BAAM-5 | 5 | 224 | 22% |
| BAAM-6 | 10 | 190 | 23% |
| BAAM-7 | 10 | 240 | 22% |
| BAAM-8 | 15 | 170 | 23% |
| Control-1* | N/A | 180 | 22% |

[a]Estimated from $^1$H NMR of polystyrene backbones. Backbone length (degree of polymerization) was kept constant at ~140.
[b]Estimated from $^1$H NMR of final brush copolymer after deuterium exchange. The AM mol % is defined as the mol percent of AM in the brushes. Details of characterization is provided in Example 2.
*Control-1 lacks the polystyrene backbone.

Figure 3:
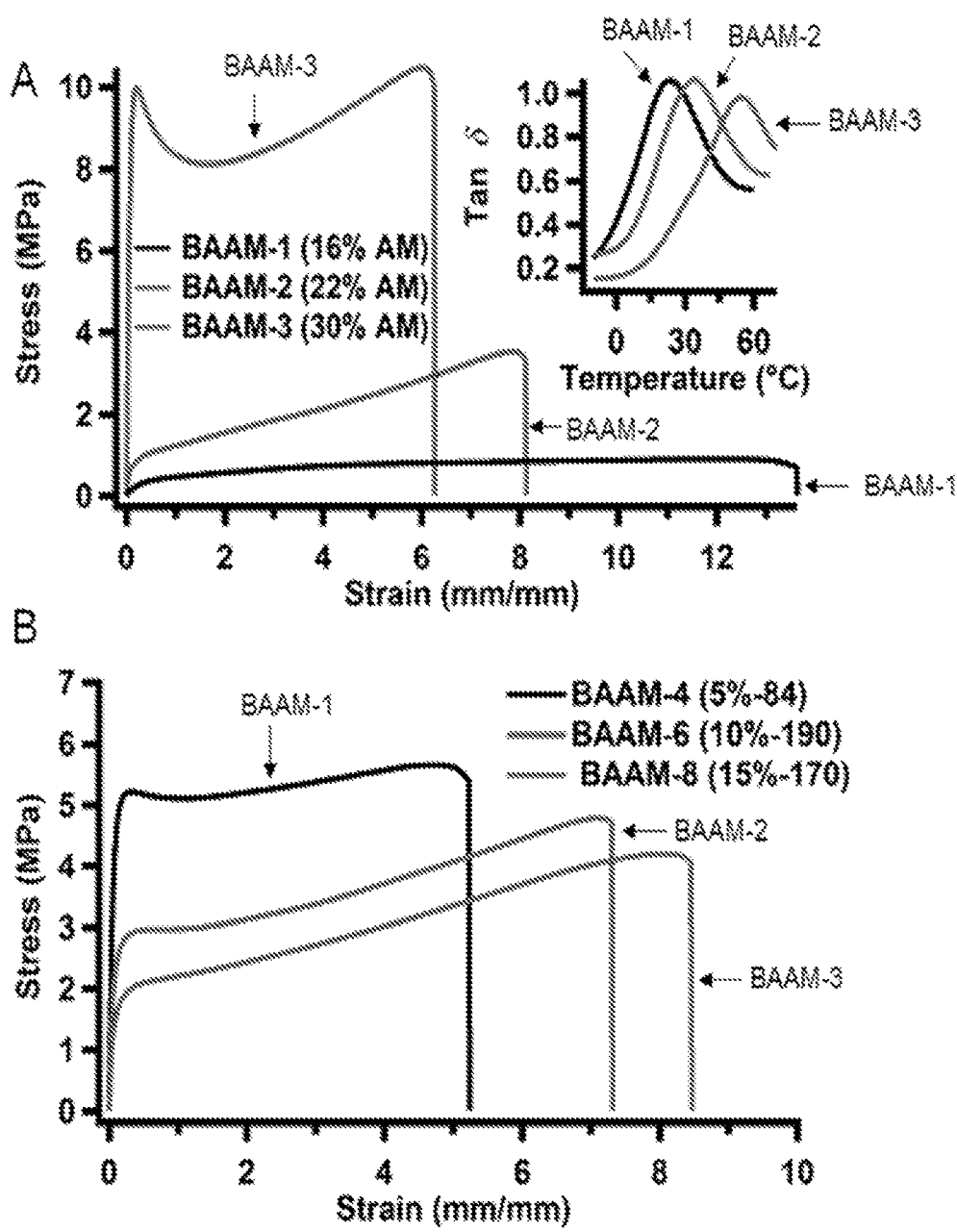
FIG. 3 is a panel of graphs of the tunability of BAAM copolymer mechanical properties by varying molecular parameters. (3A) Static tensile stress-strain curves of polymers with varying incorporation of AM monomer (graft density of 5% and brush length of ~270 repeat unit.). Inset illustrates the modulation of tan δ peak by varying the AM % in the polymer sample. (3B) Tunability of BAAM copolymer mechanical properties by varying molecular parameters (summarized as graft density-brush length). Mechanical properties such as Young's modulus, Yield strength, extensibility can be further fine-tuned by changing graft density and graft-length.
Figure 12:
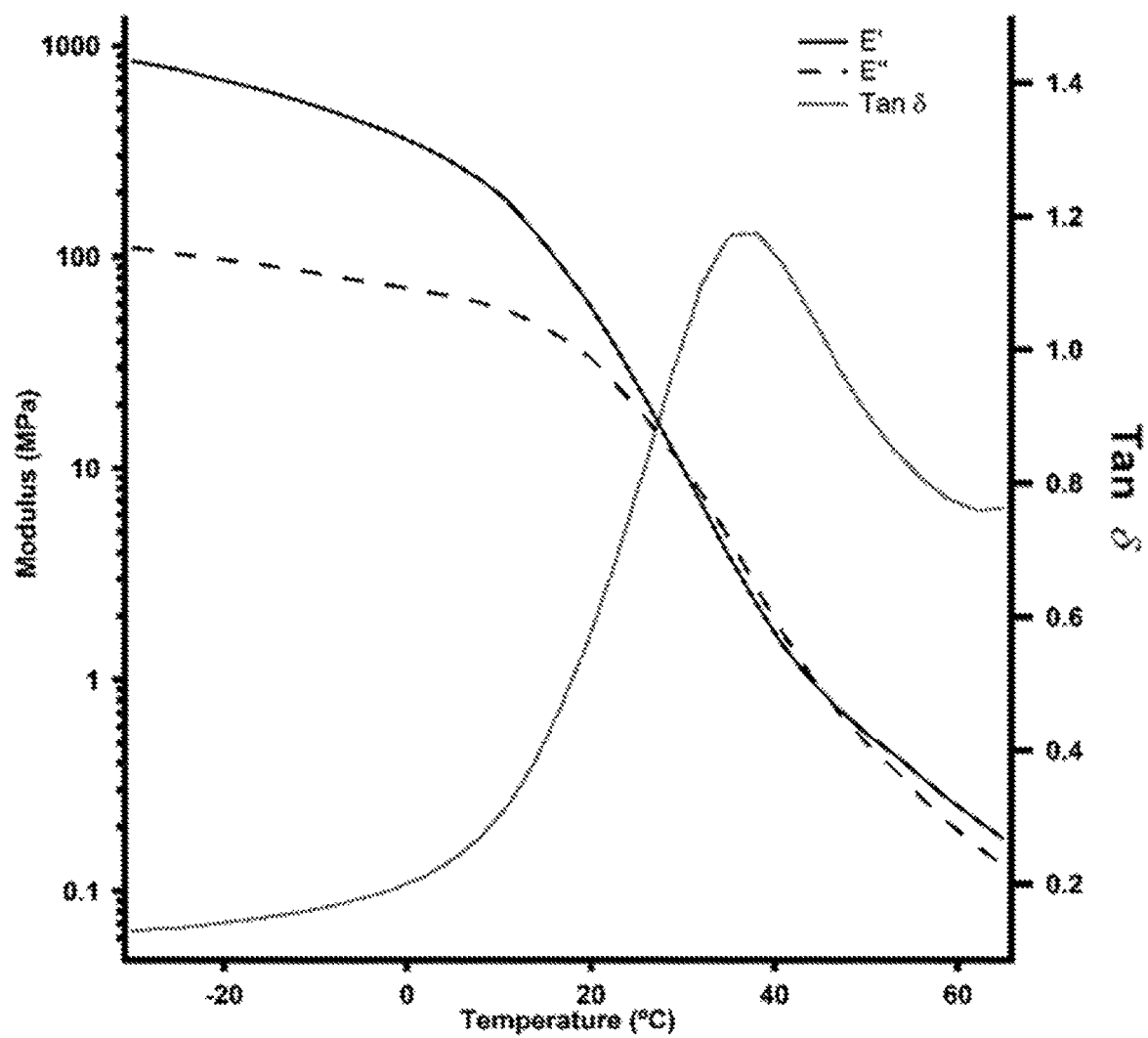
FIG. 12 are Dynamic Mechanical Thermal Analysis (DMTA) traces of BAAM-2 from −30° C. to 70° C.; storage modulus (solid), loss modulus (dash), and tan δ (dot). Temperature sweep at the frequency of 1 Hz is shown.
Figure 13:
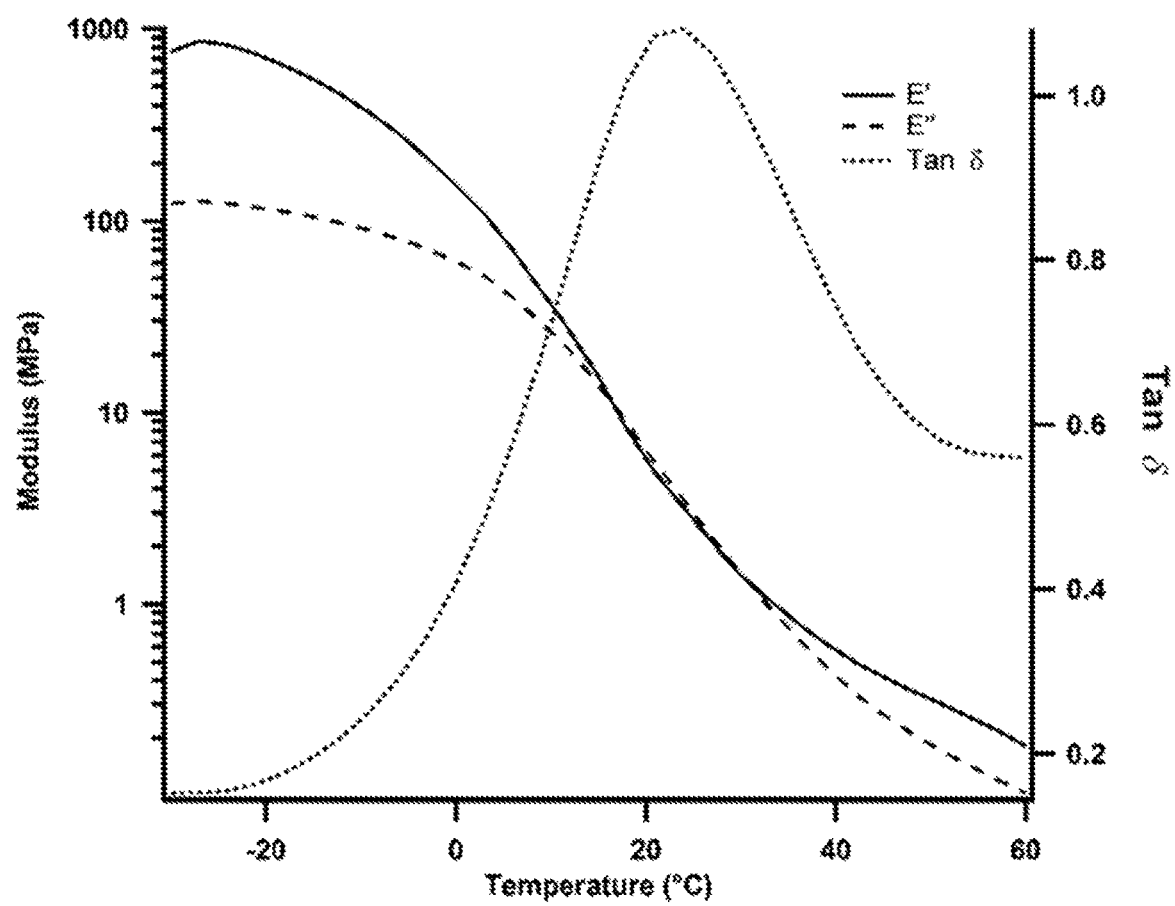
FIG. 13 are Dynamic Mechanical Thermal Analysis (DMTA) traces of BAAM-1 (16% AM) from −30° C. to 60° C.; storage modulus (solid), loss modulus (dash), and tan δ (dot). Temperature sweep at the frequency of 1 Hz is shown.

After purification and molecular characterization, the mechanical properties of each polymer were tested both in static tensile experiments and dynamic mechanical thermal analysis (DMTA). Mechanical properties of BAAM copolymers can be easily tuned over an order-of-magnitude range by varying a few easily controlled molecular parameters (FIG. 3). BAAM 1-3 polymers were first synthesized to study the effect of the concentration of AM monomer in the brushes on mechanical properties. For this series, the graft density and brush length (degree of polymerization, DP) were kept constant (~5% graft density, DP=270) with the AM content being varied by changing BA/AM feed-ratio during RAFT polymerization (BAAM-1 16 mol % AM, BAAM-2 22 mol % AM, and BAAM-3 30 mol % AM). Static tensile tests show that BAAM-1 polymer, with the lowest AM ratio (16 mol %; black line FIG. 3A), was highly extensible (ca. 1400%) with relatively low Young's modulus (ca. 5 MPa). Increasing the AM incorporation to 22 mol % in BAAM-2 (red line FIG. 3A) resulted in an increase in the Young's modulus (ca. 18 MPa) and the ultimate strength (3.2 MPa) while reducing the extensibility to 870%. The expected trend continued when more AM was incorporated in the brush copolymer: in BAAM-3 with 30 mol % AM (blue line FIG. 3A) the Young's modulus and ultimate tensile strength were increased to 162 MPa and 11 MPa respectively, while samples remained intact on extension beyond 600% strain. As can be seen in FIG. 3A, the mechanical properties at room temperature can be continuously varied from soft rubber, to stiff rubber/tough leather, to strong and tough thermoplastic elastomer, with a relatively minor change in molecular composition (change in AM mol %<15%). A summary of mechanical properties of BAAM 1-3 is reported in Table 2. We also studied the dynamic response of BAAM 1-3 across a range of temperatures (−30° C. to +65° C.) to complement the static uniaxial tension experiments (see FIGS. 11-13 for complete curves). FIG. 3A inset shows the dependence of loss-ratio (tan δ) peak position on the BA/AM ratio. DMTA characterizations reveals that as expected the simple copolymerization for brush growth offers a convenient handle to control the $T_g$ (defined here as the location of tan δ peak) of the soft phase by simply adjusting the BA/AM ratio (See Table 5 for an approximation of $T_g$ using Flory-Fox equation and an explanation of observed discrepancies and linear dependence).

The mechanical properties of the brush copolymers can also be tuned by changing the graft density and the brush length of the copolymers while keeping the AM mol %~22.

For this purpose, a new series, BAAM 4-8, were synthesized for mechanical investigation. FIG. 3B shows the additional tunability of our system by varying the graft density and brush length (degree of polymerization) for BAAM 4, 6 and 8 polymers. A summary of static mechanical properties of all polymers is reported in the Table 2. In general, the mechanical properties of the polymers correlate with the volume fractions of the hard and soft phases. The Young's modulus, tensile strength, and extensibility can be easily modulated by adjusting the volume fraction of PS hard phase in the final copolymers. BAAM-4 (FIG. 3B), with the lowest graft density (5%) and shortest brush length (94 repeat units), has the highest Young's modulus (ca. 95 MPa) and ultimate strength (ca. 6 MPa). By increasing the brush length (190 monomer repeat units) and the density of brushes (to 10%) in BAAM-6 (FIG. 3B), the Young's modulus can be tuned to 54.5 MPa and higher extensibility (712%) is achieved. Further increasing the graft density from 10% to 15% (BAAM-8) results in additional decrease in the Young's modulus and yield strength while increasing the sample extensibility (FIG. 3B). The control sample that lacks the PS hard phase has a much lower ultimate strength (0.4 MPa) and does not display any strain hardening behavior.

Figure 17:
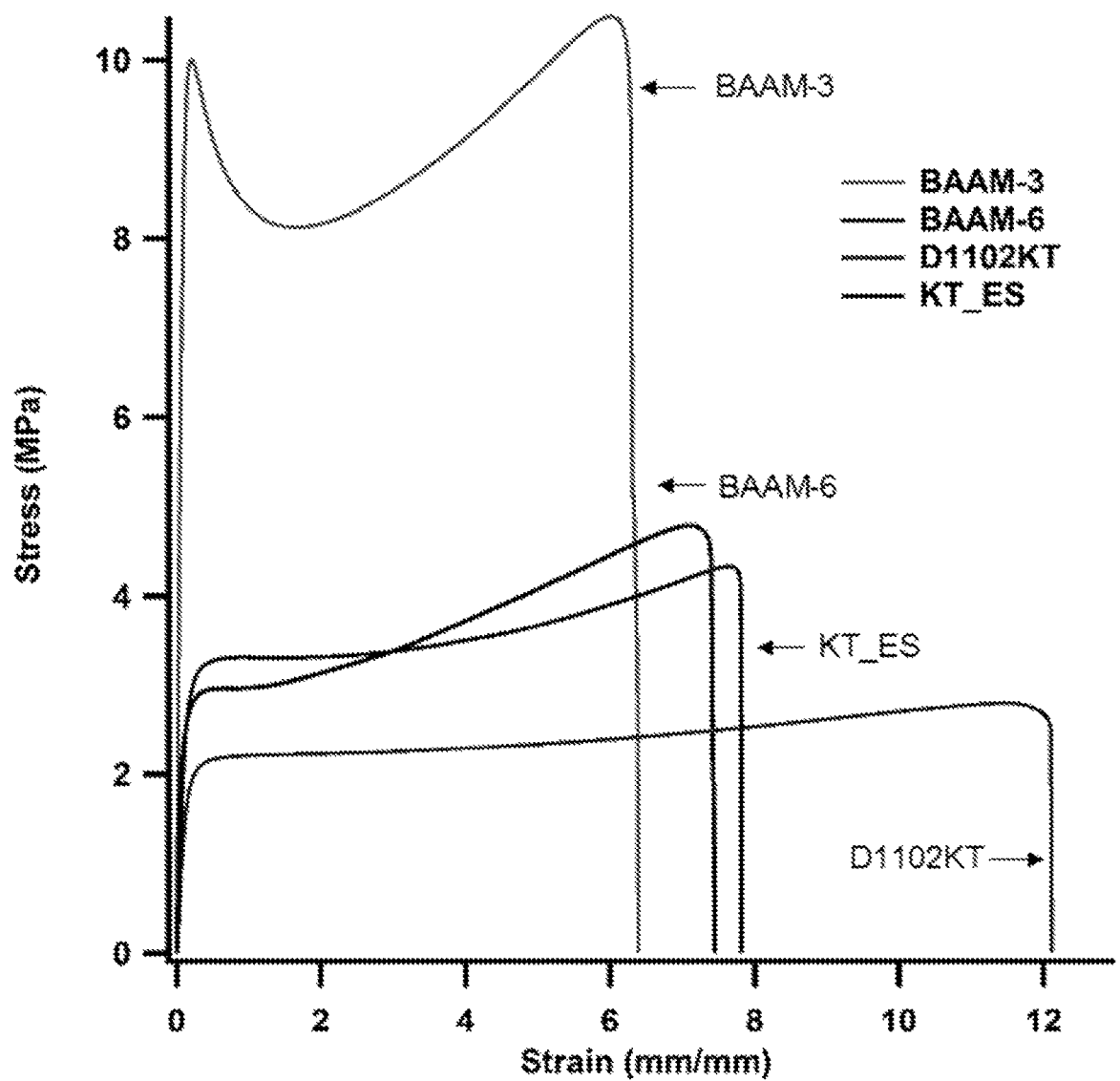
FIG. 17 is a graph of the comparison of tensile data between BAAM-3 (strongest sample), BAAM-6 (with optimal mechanical properties and efficient self-healing under ambient conditions), and commercially available polymers (Kraton D1102 and Kraton D1116 ES).

For polymers with small PS content, with high brush length (BAAM-5 and 7) or high different graft density (BAAM-8), the changes in volume fraction of the hard phase is negligible and some of their static mechanical properties, such as Young's Modulus and ultimate strength converges. Yield strength and extensibility are still tunable and are probably affected by the spacing between the brushes which regulates their assembly and interactions. These changes in molecular compositions also affects the rate of self-healing, vide infra. To our satisfaction, static tensile data quickly revealed that our affordable, modular system with increased scalability and design exhibits improved mechanical characteristics bringing the performance into closer alignment with commercial thermoplastic elastomer systems (FIG. 17), which possess no intrinsic, spontaneous self-healing function.

TABLE 2

Summary of static mechanical properties of BAAM 1-8 and Control-1.

| Polymer | Composition[a] | E (MPa)[b] | ε (%)[c] | $\sigma_{ult}$ (MPa)[d] | $U_T$ (MJ/m³)[e] |
|---|---|---|---|---|---|
| BAAM-1 | 5%-270-16% | 5.0 ± 1.2 | 1230 ± 130 | 1.2 ± 0.3 | 11.6 ± 2.7 |
| BAAM-2 | 5%-250-22% | 18.3 ± 1.1 | 867 ± 61 | 3.1 ± 0.3 | 17.2 ± 0.7 |
| BAAM-3 | 5-290-30% | 163 ± 26 | 647 ± 68 | 10.9 ± 1.3 | 60.1 ± 10.5 |
| BAAM-4 | 5%-84-24% | 95.3 ± 3.4 | 591 ± 46 | 5.8 ± 0.3 | 31.7 ± 3.3 |
| BAAM-5 | 5%-224-22% | 30.3 ± 4.4 | 1006 ± 53 | 4.2 ± 0.4 | 29.9 ± 0.8 |
| BAAM-6 | 10%-190-23% | 54.5 ± 2.0 | 712 ± 40 | 4.8 ± 0.2 | 26.1 ± 2.0 |
| BAAM-7 | 10%-24022% | 32.8 ± 3.7 | 778 ± 134 | 4.1 ± 0.4 | 20.5 ± 2.3 |
| BAAM-8 | 15%-170-23% | 32.0 ± 2.9 | 802 ± 92 | 4.0 ± 0.4 | 25.4 ± 3.6 |
| Control-1 | N/A-180-22% | 7.6 ± 1.24 | 2270 ± 137 | 0.36 ± 0.02 | 2.0 ± 0.2 |

[a]Reported as graft density (%)-degree of polymerization-AM mol %.
[b]Calculated from the initial slope of stress-strain curves.
[c]Ultimate extensibility
[d]Ultimate Strength-at-break
[e]Toughness, calculated from integrating the area under the stress-strain curve. All static tensile experiments are conducted with the strain rate of 100 mm · min⁻¹, at 24° C.

Figure 4:
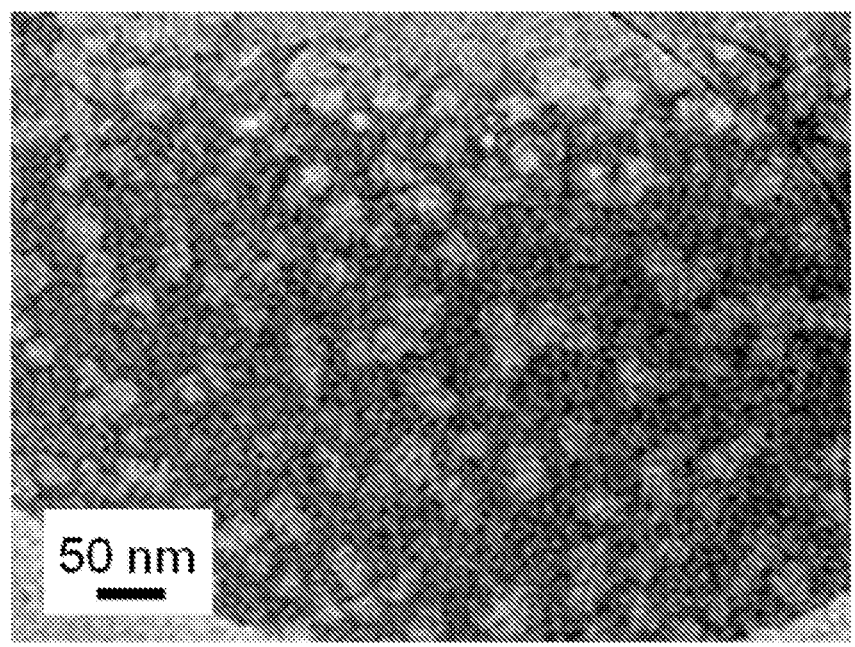
FIG. 4 is a TEM image for the morphological characterization of BAAM system. The TEM image shows spherical PS aggregated in a matrix of BA/AM brushes

The phase morphology of BAAM polymer samples in the solid state was investigated by transmission electron microscopy (TEM). As shown in FIG. 4, spherical PS nanodomains with size (diameter) ~25 nm are dispersed in a continuous matrix of soft brushes containing dynamic hydrogen bonds which are stained by uranyl acetate to appear darker. This is consistent with our previous reports and demonstrates that the two-phase morphology is retained despite the change in monomer compositions.

Finally, we investigated the self-healing properties of BAAM polymers. All BAAM polymer samples with AM incorporation of 16 mol % and 22 mol % healed spontaneously under mild conditions. The $T_g$ for 30 mol % AM polymer, BAAM-3, was higher than 50° C., which understandably prohibits self-healing at room temperature (intermediate-to-long range chain mobility is a requirement for effective healing performance). We focused our self-healing studies on BAAM 4-8 with 22 mol % AM polymers. Each tensile specimen was damaged by making a well-defined cut to the depth of 70-90% of sample thickness using a razor blade. The two cut interfaces were then pressed back together for 1 min.

Figure 5:
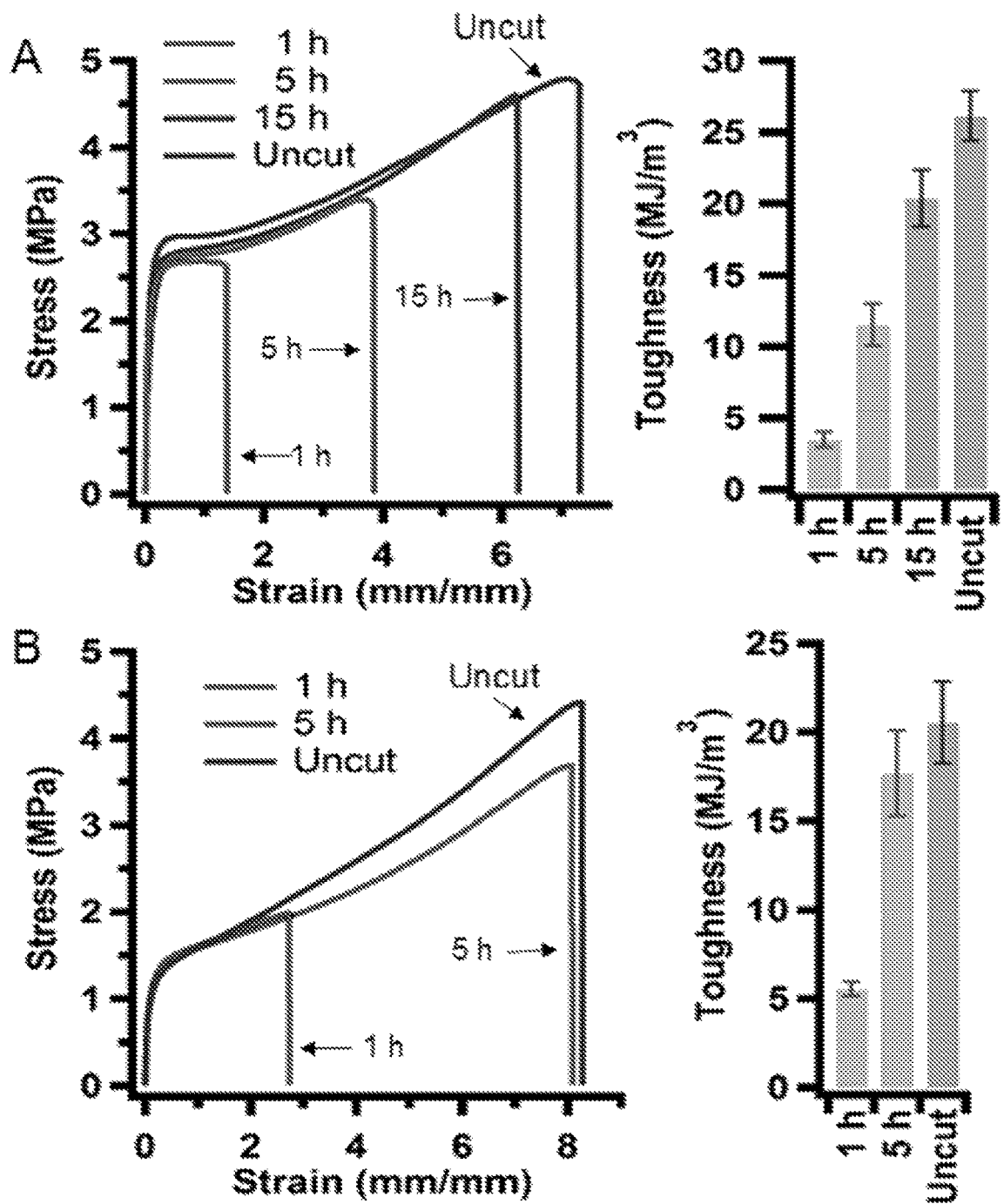
FIG. 5 is a panel of graphs of representative self-healing tests for (FIG. 5A) BAAM-6 (10%-190) and (FIG. 5B) BAAM-7 (10%-240) at 30° C. and ambient humidity. The bar graph summarizes the toughness recovery for any time point. Error bars are standard deviation of minimum of three measurements.
Figure 6:
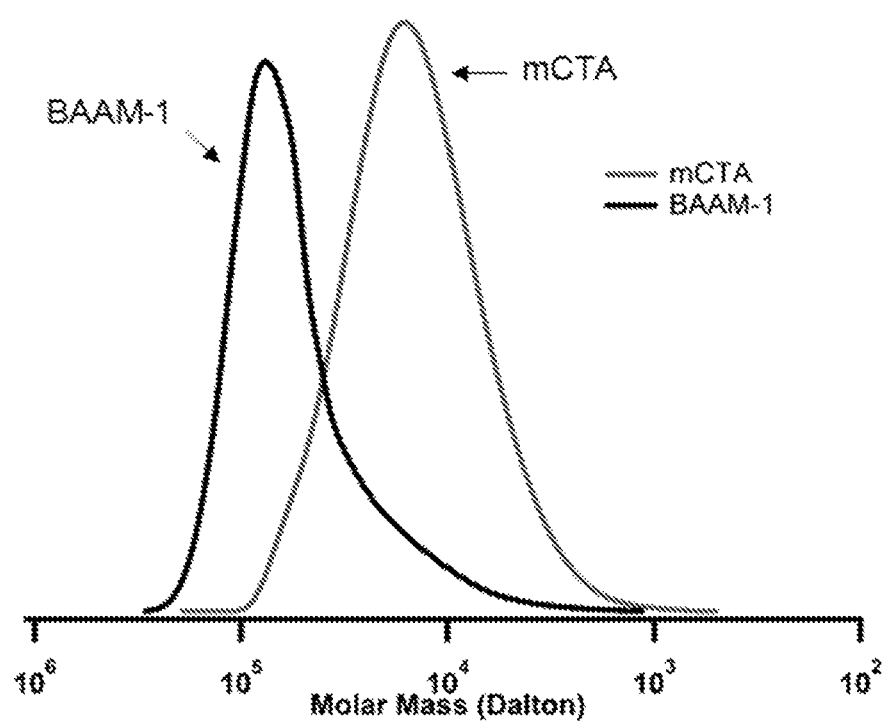
FIG. 6 are representative GPC traces of m-CTA and BAAM-1 in DMF showing an increase in $M_n$ after RAFT polymerization.
Figure 14:
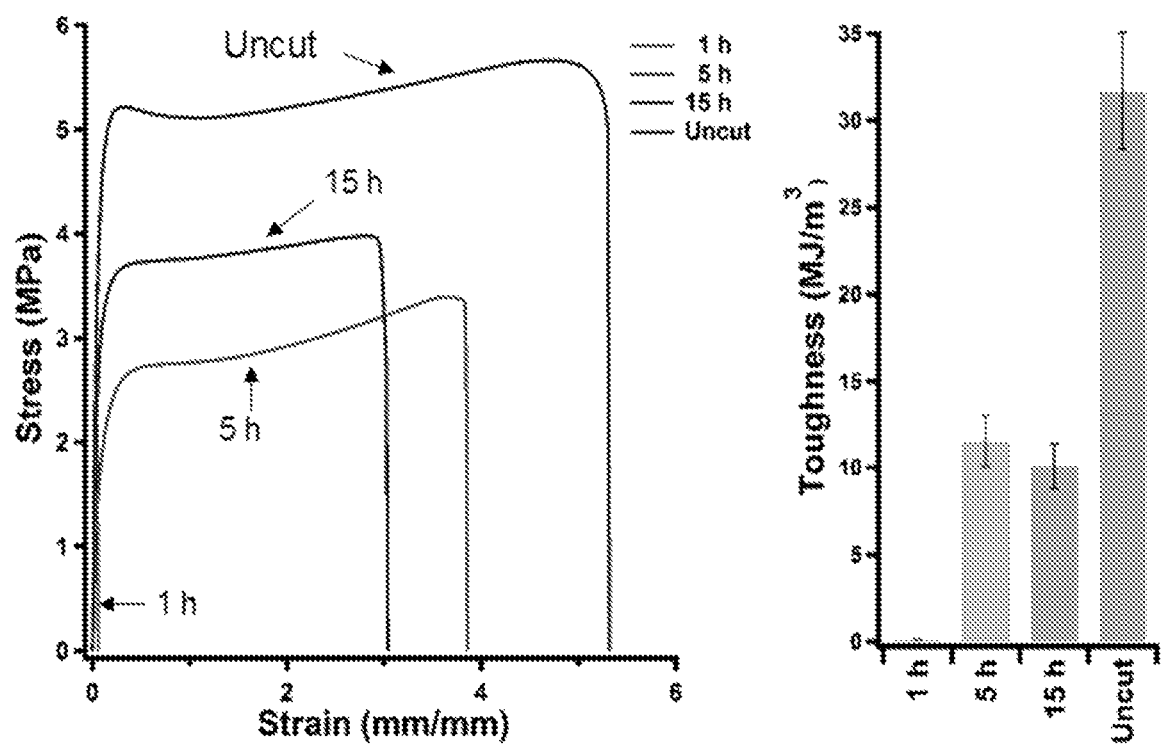
FIG. 14 is a panel showing results of self-healing tests for BAAM-4 samples at 30° C. with ambient humidity. The bar graph summarizes the toughness recovery for any time point. Error bars are standard deviation for minimum of three measurements.
Figure 15:
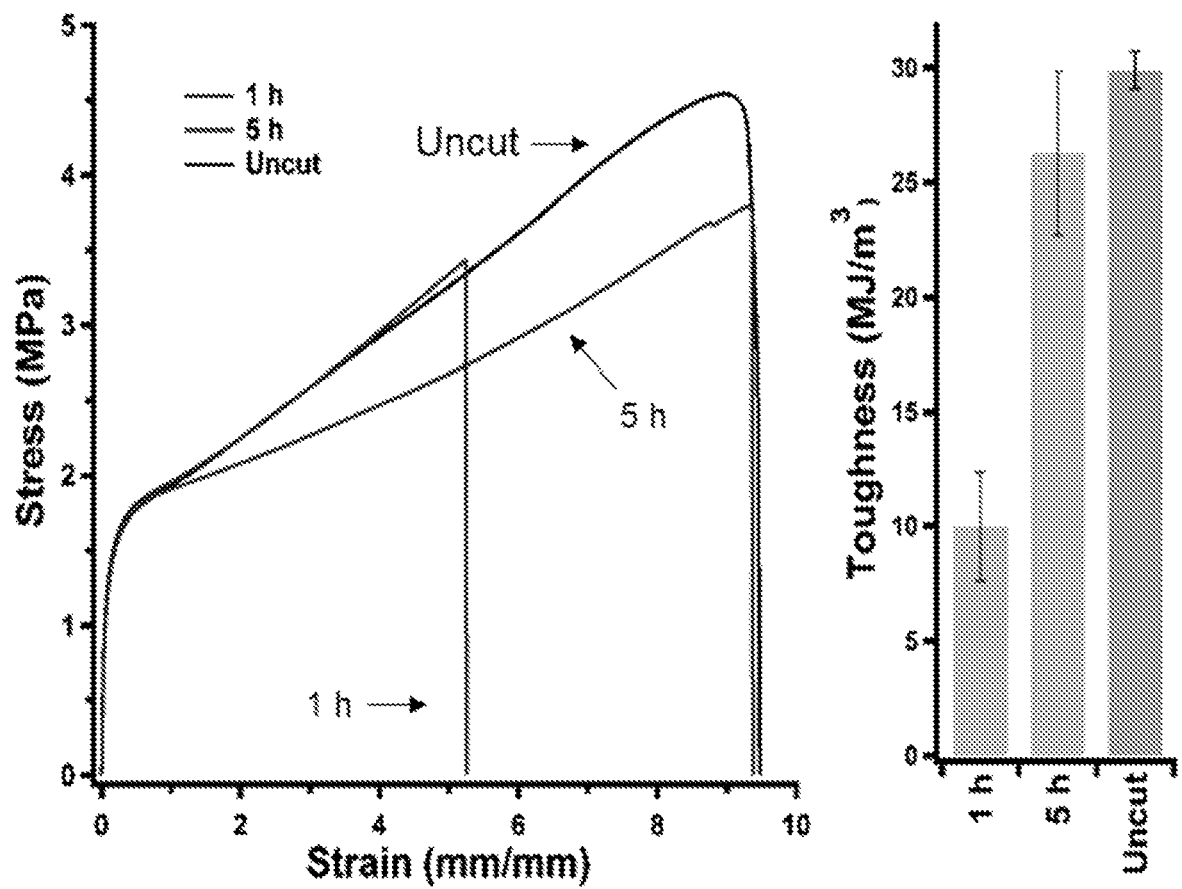
FIG. 15 is a panel showing results of self-healing tests for BAAM-5 samples at 30° C. with ambient humidity. The bar graph summarizes the toughness recovery for any time point. Error bars are standard deviation for minimum of three measurements.
Figure 16:
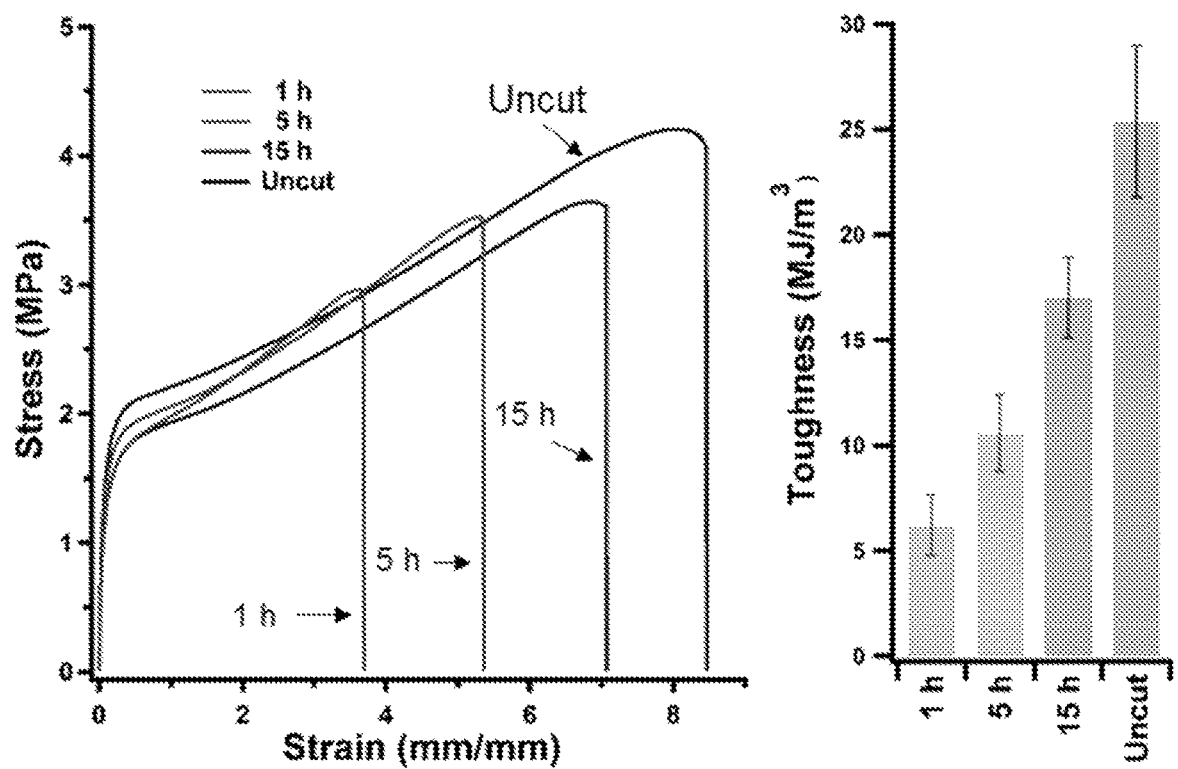
FIG. 16 is a panel showing results of self-healing tests for BAAM-8 samples at 30° C. with ambient humidity. The bar graph summarizes the toughness recovery for any time point. Error bars are standard deviation for minimum of three measurements.

The damaged samples showed very good self-healing ability. For all healing times, stress-strain curves closely followed the shapes of the original uncut samples. While all samples quickly recovered their strength up to the yield point, samples with lower brush length (BAAM-6 and BAAM-8, average brush length 180 units) recovered more than 85% of their original strength and extensibility in 15 h (FIGS. 5A and 16). Polymer samples with longer brush length (BAAM-5, BAAM-7 with an average brush length of 230) had an improved the rate of self-healing: recovery of extensibility and ultimate strength was achieved in 5 h (FIGS. 5B and 15). BAAM-4, with the shortest brush length and lowest graft density, recovered up to 60% of the ultimate strength of the pristine sample and 70% of original extensibility (FIG. 14).

In summary, we have demonstrated that strong, tunable, and self-healing polymer materials can be synthesized from simple commercially available building blocks in a facile and scalable manner. The mechanical properties of the materials can be conveniently tuned by varying several molecular parameters including the acrylamide ratio, the brush length and density. The new multiphase polymers show excellent self-healing performance under mild conditions. We expect that this new class of materials to have a broad impact given the simplicity of synthesis, commercial availability of all building blocks, and high level of tunability of mechanical properties.

Example 2

General Materials and Methods $^1$H spectra were recorded on 500 MHz and 600 MHz Bruker instruments. Chemical shifts were reported in standard format as values in ppm relative to deuterated solvents. Gel permeation chromatography (GPC) was performed in THF (1 mL/min) using an Agilent LC 1100 Series equipped with Polymer Laboratory's PLgel 5 µm mixed-C column to determine molecular weights and molecular weight distributions, $M_w/M_n$, of the macro-CTAs with respect to polystyrene (PS) standards (Varian, Palo Alto, Calif.). Brush copolymers were analyzed using GPC in DMF with 0.1% LiBr (w/v) (1 mL/min) using an Agilent LC 1100 Series equipped with OHpak SB-803 HQ column from Shodex to determine molecular weights and molecular weight distributions, $M_w/M_n$, with respect to poly(ethylene glycol) (PEG) standards (Sigma Aldrich).

All other chemicals were purchased from Sigma Aldrich and were used as received. Inhibitors were removed by passing the monomers through basic alumina column for butyl acrylate and styrene. 4-vinylbenzyl chloride, technical grade, was used as received and was not passed through basic column before polymerization.

Synthesis and Characterization

Typical Macro-CTA Synthesis

Macro-CTA synthesis was carried out as previously described. [24]

Synthesis of Brush Copolymers, BAAM

A typical procedure for the synthesis of BAAM brush copolymers using RAFT polymerization is given below. Control-1 was synthesized by RAFT polymerization using a small molecule chain transfer agent instead of macro-CTA, resulting in a linear copolymer of BA and AM comonomer.

m-CTA (0.5 g, 0.44 mmol CTA, 10% CTA) was added to a Schlenk flask. BA (13.4 mL, 94 mmol) and 2 mL anisole as NMR internal standard were dissolved in DMF (97 mL) and added to the flask under stirring. After complete dissolution of m-CTA, acrylamide (3.00 g, 42.2 mmol) and AIBN (25 mg) was added to the reaction flask ([Monomer]:[CTA]:[AIBN]=310:1:0.2). 50 µL sample was taken for calculating the conversion using $^1$H NMR and reaction flask was sealed by a rubber septum. The reaction mixture was then purged with a stream of $N_2$ for 45 min followed by 15 min of head space purging. Schlenk flask was immersed in an oil bath thermostatted at 55° C. After 11.5 h, the reaction was removed from the oil bath and was cooled on ice. The conversion was determined with $^1$H NMR by comparing the integration of vinyl protons with respect to anisole protons ($OCH_3$). 20 mg of 4-methoxyphenol was added as radical inhibitor and the solvent was evaporated in vacuo. The polymer was precipitated by slow addition of viscous residue to 1 L of methanol-water mixture, (1:1 v/v). It was necessary to use a mechanical overhead stirrer in a large beaker to successfully precipitate the polymer under continued stirring. The supernatant was carefully decanted and polymer was washed sequentially with hexane (2×) and methanol-water solution (2×, 1:1 v/v) to remove the unreacted monomer. Finally, the polymer was resuspended in methanol-chloroform solution and was transferred to a Teflon dish. Solvent was allowed to evaporate at room temperature overnight and the residual solvent was removed by heating the samples in a vacuum oven overnight at 80° C.

$M_n$ and $M_w/M_n$ for each polymer was determined by size exclusion chromatography using DMF as solvent and PEG as standard. The results are summarized in Table 3. Molecular composition was characterized by $^1$H NMR, according to the protocol that is described in the next section.

TABLE 3

Molecular weight and molecular weight distributions of polymers measured by GPC using DMF as eluent, and PEG as standard.

| Polymer | $M_n$ (kg/mol) | $M_w/M_n$ |
|---|---|---|
| BAAM-1 | 38.7 | 1.8 |
| BAAM-2 | 43.7 | 1.7 |
| BAAM-3 | 44.2 | 1.7 |
| BAAM-4 | 28.2 | 1.8 |
| BAAM-5 | 27.2 | 1.9 |
| BAAM-6 | 22.2 | 2.9* |
| BAAM-7 | 28.9 | 2.2* |
| BAAM-8 | 15.9 | 4.0* |
| Control-1 | 6.27 | 1.12 |

*A Minor shoulder is observed after the main polymer peak (relative intensity <10%). This peak can be corresponded to the presence of small amount of free polymer brush that is not attached to the polystyrene backbone.

Characterization of Copolymers Using $^1$H NMR

Figure 7:
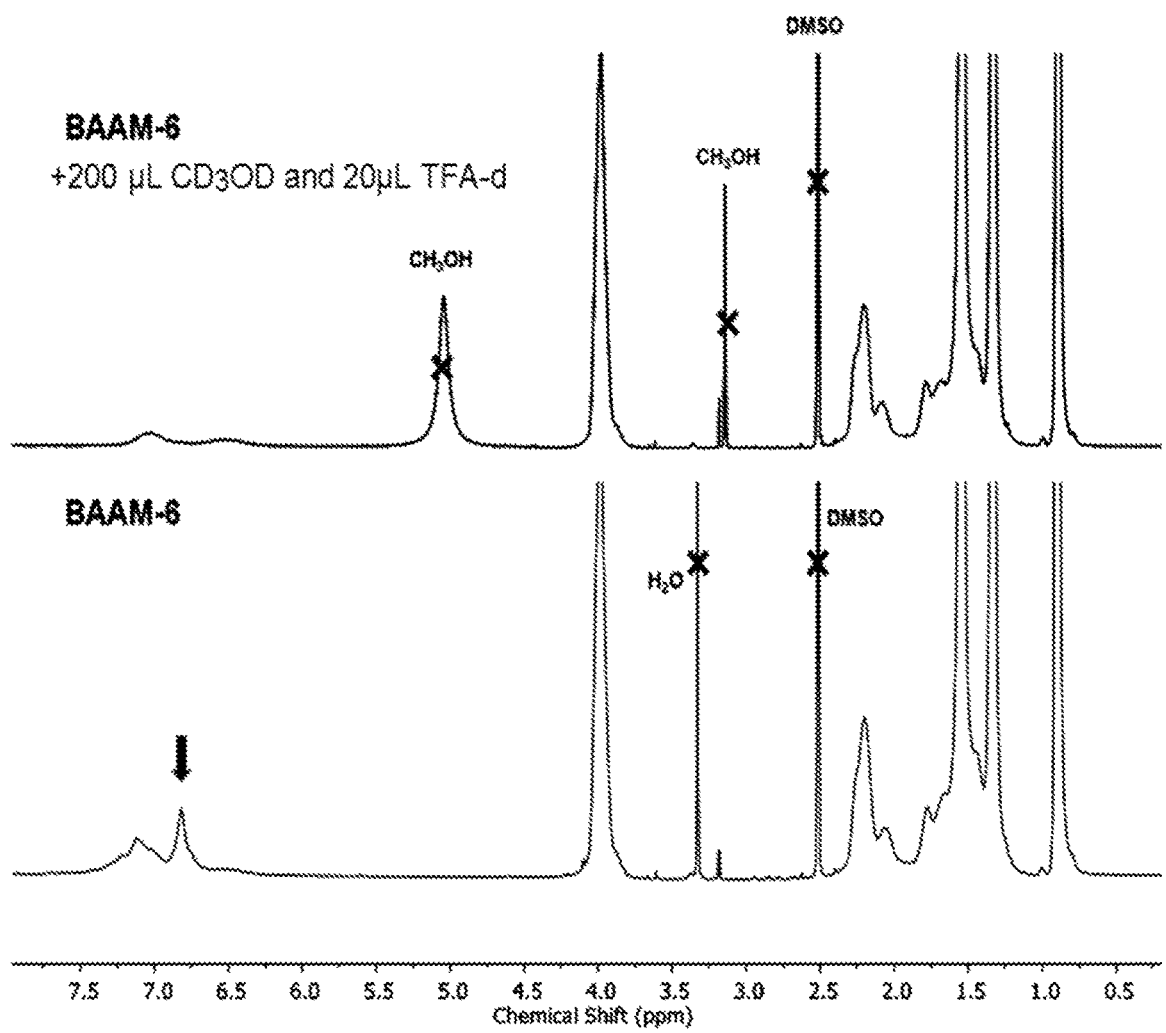
FIG. 7 is the $^1$H NMR spectrum of BAAM-6 in DMSO-$d_6$ before (bottom spectrum) and after H-D exchange (top spectrum). To circumvent the signal overlap, between the amide protons of AM (marked with arrow) and PS backbone, H-D exchange was conducted by the addition of $CD_3OD$ and TFA-d.

Due to the overlap of signals corresponding to the AM monomer, with signals from PS backbone and other backbone protons, the following protocol was followed to characterize the polymer compositions using $^1$H NMR. Each polymer was initially dissolved in DMSO-d$_6$ and a proton spectrum was recorded to ensure the removal of unreacted monomers (FIG. 7, bottom spectrum). The amide protons were then exchanged with deuterium by the addition of 200 µL of CD$_3$OD and 20 µL of deuterated trifluoroacetic acid (TFA-d, acid catalyst to facilitate the exchange). Another proton spectrum was recorded after 5 min, to ensure the completion of H-D exchange reaction (FIG. 7, top spectrum). The average brush degree of polymerization and AM content of each polymer was calculated for each BAAM samples from the second spectrum. A sample calculation is provided below.

Figure 8:
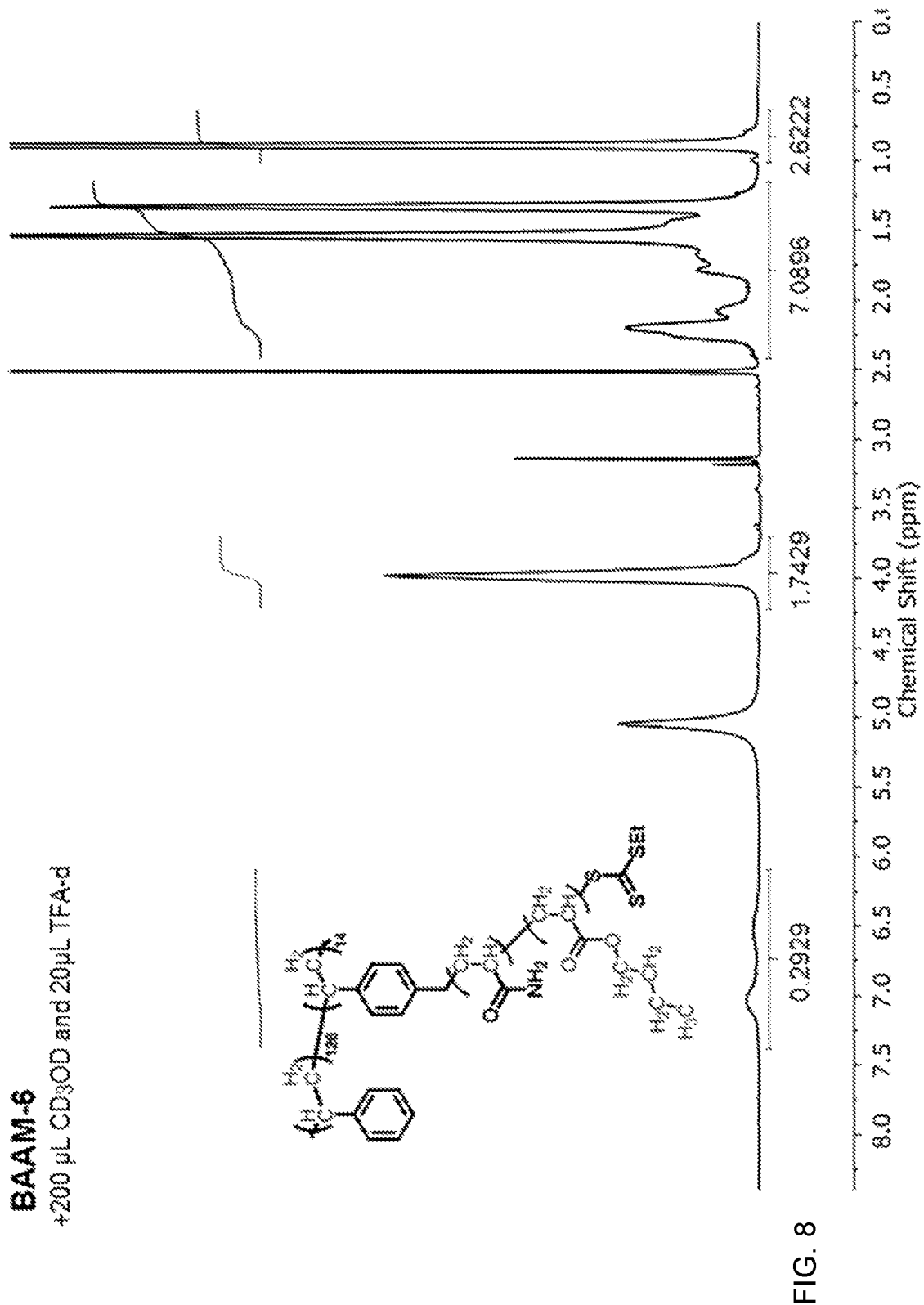
FIG. 8 is the $^1$H NMR spectrum of BAAM-6 in DMSO-$d_6$ after H-D exchange.

FIG. 8 provides the $^1$H NMR spectrum of BAAM-6 in DMSO-d$_6$ after H-D exchange. A sample calculation is provided for calculating the degree of polymerization and AM mol %.

Sample Calculation:

x and y are the number of BA and AM repeat units in each brush respectively.

$$\frac{14 \times 2x}{14 \times 4 + 126 \times 5} = \frac{1.7429}{0.2929} \to x = 145.8$$

$$\frac{(3 \times 126 + 3 \times 14) + (3 \times 14y) + (3 \times 14x) + (4 \times 14y)}{28x} =$$

$$\frac{7.0896}{1.7429} \to y = 45.1$$

$DP = 145.7 + 45.1 = 190, AM$ mol $\% = 23\%$

TABLE 4

Relative intensities of integrals of $^1$H NMR peaks used for the calculation of degree of polymerization and AM mol %.

| Polymer | Relative Intensities | | | |
| --- | --- | --- | --- | --- |
|  | δ (0.7-1 ppm) | δ (1.2-2.3 ppm) | δ (3.8-4.1 ppm) | δ (6.1-7.9 ppm) |
| BAAM-1 | 6.71 | 17.57 | 4.39 | 1.00 |
| BAAM-2 | 5.70 | 15.57 | 3.78 | 1.00 |
| BAAM-3 | 6.05 | 17.30 | 3.98 | 1.00 |
| BAAM-4 | 1.20 | 3.39 | 0.78 | 1.00 |
| BAAM-5 | 5.77 | 15.79 | 3.86 | 1.00 |
| BAAM-6 | 8.95 | 24.20 | 5.95 | 1.00 |
| BAAM-7 | 11.30 | 30.16 | 7.51 | 1.00 |
| BAAM-8 | 13.02 | 35.14 | 8.75 | 1.00 |

Morphological Characterization of BAAM Copolymers

TEM Method

TEM was performed on a FEI/Philips CM-20 conventional TEM operated at an accelerating voltage of 200 kV. The polymer was drop casted from MeOH and DCM mixture (1:1 v/v, polymer concentration 10 mg/mL) and the soft phase was stained by floating the TEM grid (purchased from Ted Pella) on a 0.5 wt % aqueous solution of uranyl acetate for 30 s followed by removing excess solvent by placing the sample on filter paper. The samples were annealed at 80° C. overnight under vacuum.

Thermal Characterization

I. Differential Scanning Calorimetry (DSC)

Figure 9:
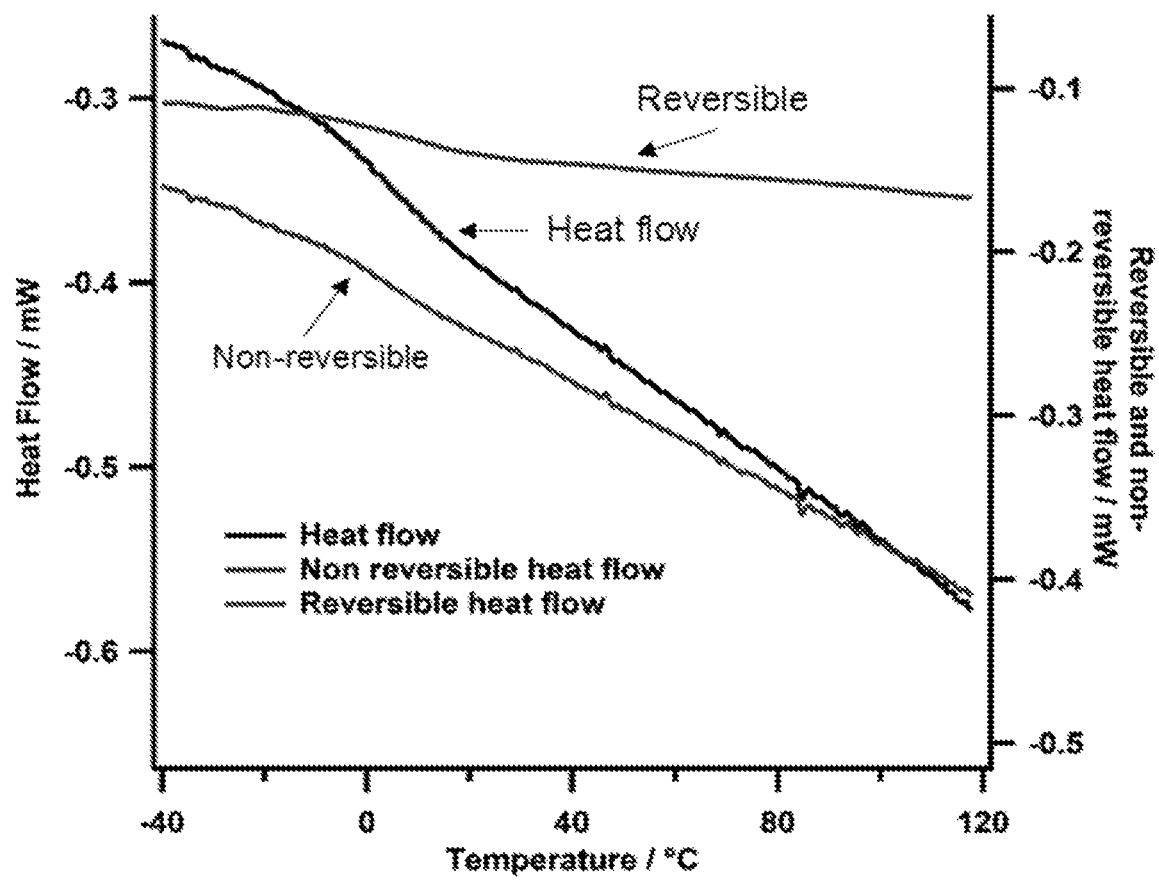
FIG. 9 is a graph of results of modulated differential scanning calorimetry of BAAM-7. Experiments were conducted at a heating rate of 3° C./min under nitrogen atmosphere.
Figure 10:
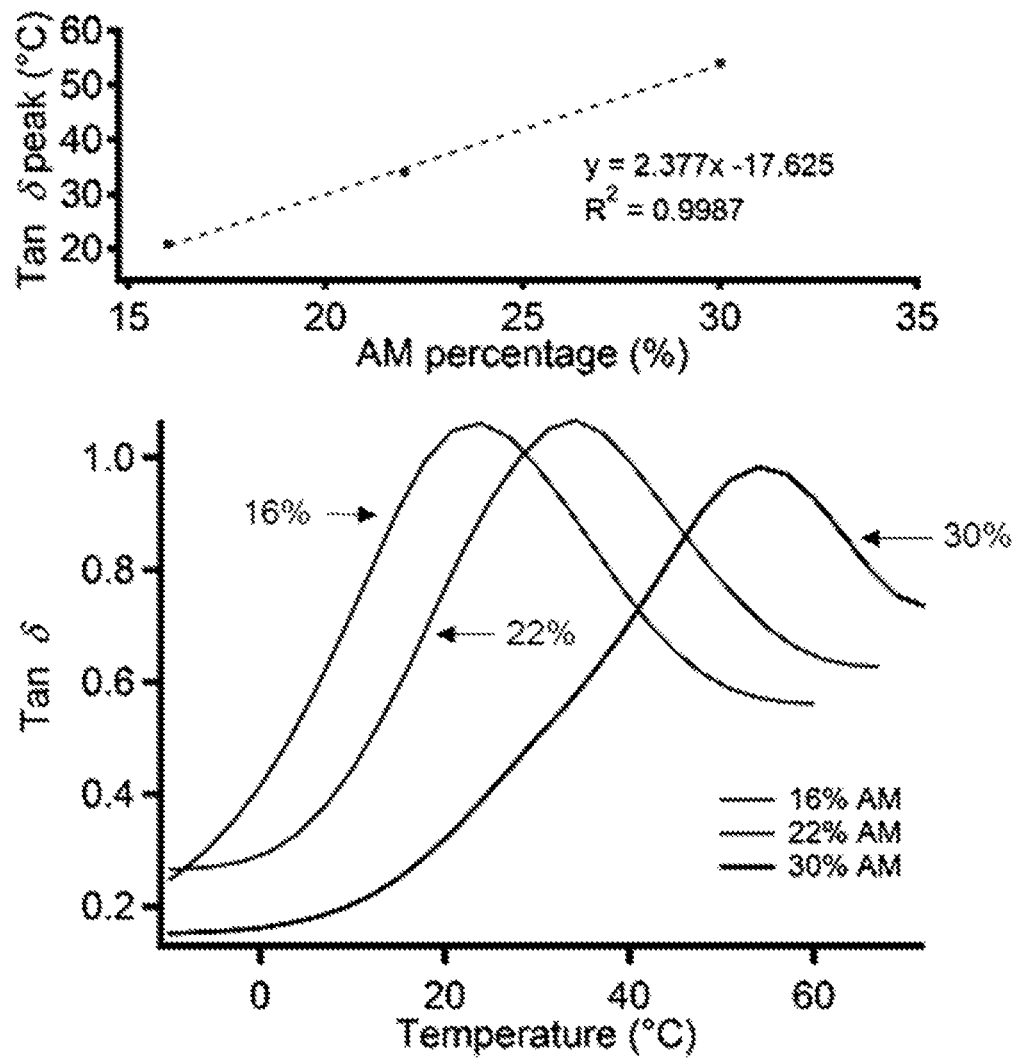
FIG. 10 is a panel showing that changing the AM mol % in the copolymers is an easy handle to modulate the $T_g$ as evident by the changes in the Tan delta peak location for different AM mol %.

FIG. 9 shows the modulated differential scanning calorimetry of BAAM-7.

II. Calculation of T$_g$ Using Flory-Fox Equation and Comparison with DSC and DMA Data Flory-Fox equation (below) can be used to estimate the T$_g$ of a random copolymer from the weight percent of each monomer and the T$_g$ of homopolymers of each component $$\frac{1}{T_g} = \frac{W_1}{T_{g1}} + \frac{W_2}{T_{g2}}$$

In the above equation, w$_1$ and w$_2$ represent the weight fraction of each component and T$_{g1}$ and T$_{g2}$ are the glass transition temperatures for the homopolymers of each monomer. In this case, component 1 is AM (T$_g$~165° C.) and component 2 is BA (T$_g$~−54° C.). The PS weight fraction is negligible and is therefore excluded from the calculation. The following Table 5 summarizes the expected T$_g$ for the different AM weight % according to FF equation.

TABLE 5

Summary of AM mol %, weight %, and calculated T$_g$ from FF equation for BAAM 1-3.

| Sample (AM mol %) | AM weight % | Calculated T$_g$ from FF equation (° C.) |
| --- | --- | --- |
| BAAM-1 (16%) | 9.5% | −42. |
| BAAM-2 (22%) | 13.5% | −38 |
| BAAM-3 (30%) | 19.2% | −31 |

The difference between the calculated values and the observed T$_g$ according to the DSC experiment (FIG. 9 for BAAM-7 with AM mol %~22) is presumably due to the difference in the architecture of polymers. FF equation is applicable to linear polymers while in our case, the proximity of brushes can change the mobility and resulting T$_g$ (see Macromolecules 1988, 21, 2610-2619, incorporated by reference herein).

Figure 11:
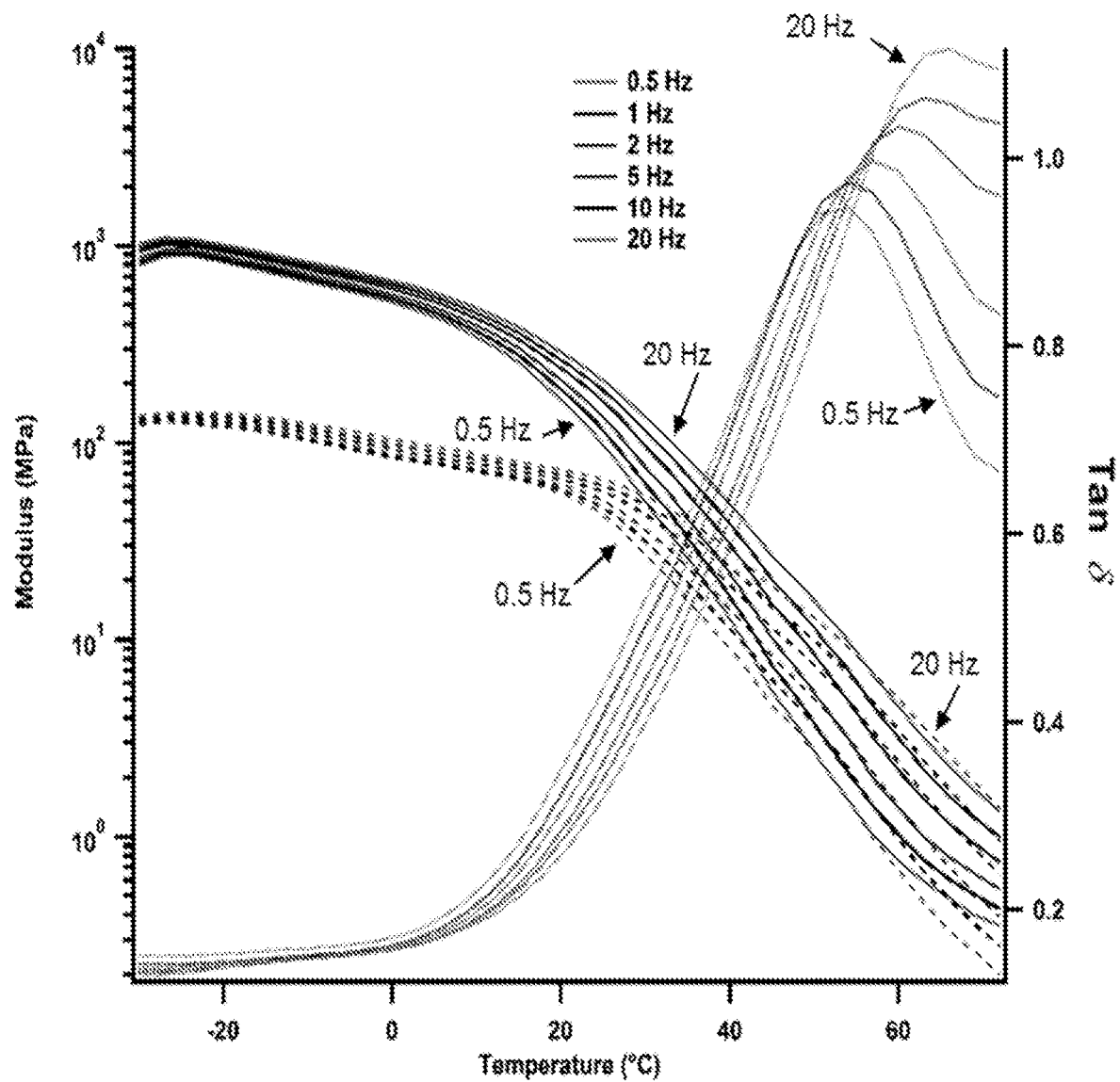
FIG. 11 are Dynamic Mechanical Thermal Analysis (DMTA) traces of BAAM-3 from −30° C. to 70° C.; storage modulus (solid), loss modulus (dash), and tan δ (dot). Multi-frequency (0.5, 1, 2, 5, 10, and 20 Hz) temperature sweep of polymer sample using DMA. The a transition occurs at approximately 50-65° C.

Differences between DMA and DSC results are expected as the former is a functional measure of T$_g$ and it is known that the T$_g$ shifts to a higher value as the frequency of DMA experiment is increased (See FIG. 11).

Plotting the calculated T$_g$ versus the AM mol % is expected to result in a non-linear graph. Nonetheless, this curve can be approximated with a line if the changes in the AM content is sufficiently small (as it is case here).

Mechanical Characterization

Sample Preparation

Samples were prepared by hot-pressing the resin into heated Teflon molds at 100° C. and allowing them to cool down to room temperature while maintaining the pressure (cooling time approximately 30 min). Basic mechanical properties (FIG. 3A and Table 5) were measured as described in the next section, mechanical testing procedure. Average sample size was 15 mm×7 mm×2 mm (length, width, thickness).

Preparation of Samples from Commercially Available Polymers

Kraton pellets (12 g) were added slowly to a stirred solution of toluene maintained at 80° C. until all of the polymer was dissolved. The resulting clear solution was then poured into Teflon mold and the solvent were removed by heating in a vacuum oven. The resulting clear film was removed from the mold and the tensile samples were prepared by compression molding at 170° C. Average sample size was 15 mm×7 mm×2 mm (length, width, thickness).

Mechanical Testing Procedure

The mechanical properties of the copolymers were measured using an Instron 3365 machine in standard stress/strain experiments. The specimen were extended at 100 mm/min at room temperature. Each measurement was repeated at least three times. Young's modulus (E) was determined from the initial slope of the stress-strain curves. Dynamic thermal mechanic analysis experiments were performed using a TA Instruments DMA Q800. The dynamic response of polymers was measured across multiple temperature and frequencies. Storage, loss modulus and tan delta (ratio of loss/storage moduli) were plotted versus the temperature. Generally, the response of different BAAM copolymers were similar and only the location of tan delta peak shifted significantly across different samples. A representative graph for BAAM-3 (30% AM) is shown in FIG. 11 for multiple frequencies. For the other percentages of AM (16% and 22%), the data is only shown for the frequency of 1 Hz (see FIGS. 12 and 13).

In all cases, the location of peak of tan delta versus temperature at 1 Hz is considered as a functional measure of $T_g$.

Sample Damaging and Healing Tests

For self-healing tests, a well-defined cut was applied to the depth of 70-90% of sample thickness using a razor blade. The cut faces were pressed together for 1 minute and the sample was let to heal at 30° C. for various times. The self-healed samples were then allowed to cool down to room temperature (5-10 min) and were subjected to stress-strain tests at room temperature at 100 mm/min pulling rate. See Table 6 and FIGS. 14-17 for results.

TABLE 6

Summary of self-healing results.

| Polymer | Self-healing | | |
|---|---|---|---|
| | $\varepsilon_{rec}$ (%)[a] | $\sigma_{rec}$ (%)[b] | $U_{T, rec}$ (%)[c] |
| BAAM-4 | 424 (70%) | 3.4 (60%) | 11.5 (36%) |
| BAAM-5 | 966.5 (96%) | 3.86 (91%) | 26.3 (87%) |
| BAAM-6 | 4.61 (96%) | 553 (78%) | 20.6 (80%) |
| BAAM-7 | 3.54 (86%) | 776 (100%) | 17.7 (86%) |
| BAAM-8 | 3.45 (86%) | 673 (84%) | 16.2 (64%) |

[a]Ultimate extensibility followed by percent recovery of extensibility compared to pristine samples).
[b]Ultimate strength (MPa) followed by percent recovery of ultimate strength compared to pristine samples).
[c]Toughness (MJ/m$^3$), calculated from integrating the area under the stress-strain curves, followed by percent recovery of toughness compared to pristine samples).

REFERENCES

The following publications are incorporated by reference herein in their entirety:

(1) Murphy, E. B.; Wudl, F. *Prog. Polym. Sci.* 2010, 35, 223.
(2) Yang, Y.; Urban, M. W. *Chem. Soc. Rev.* 2013, 42, 7446.
(3) Dry, C. *Compos. Struct.* 1996, 35, 263.
(4) Cho, S. H.; Andersson, H. M.; White, S. R.; Sottos, N. R.; Braun, P. V. *Adv. Mater.* 2006, 18, 997.
(5) White, S. R.; Sottos, N. R.; Geubelle, P. H.; Moore, J. S.; Kessler, M. R.; Sriram, S. R.; Brown, E. N.; Viswanathan, S. *Nature* 2001, 409, 794.
(6) Toohey, K. S.; Sottos, N. R.; Lewis, J. A.; Moore, J. S.; White, S. R. *Nat. Mater.* 2007, 6, 581.
(7) White, S. R.; Moore, J. S.; Sottos, N. R.; Krull, B. P.; Santa Cruz, W. A.; Gergely, R. C. R. *Science* 2014, 344, 620.
(8) Kirkby, E. L.; Rule, J. D.; Michaud, V. J.; Sottos, N. R.; White, S. R.; Manson, J.-A. E. *Adv. Funct. Mater.* 2008, 18, 2253.
(9) Lu, Y.-X.; Guan, Z. *J. Am. Chem. Soc.* 2012, 134, 14226.
(10) Canadell, J.; Goossens, H.; Klumperman, B. *Macromolecules* 2011, 44, 2536.
(11) Amamoto, Y.; Otsuka, H.; Takahara, A.; Matyjaszewski, K. *Adv. Mater.* 2012, 24, 3975.
(12) Zheng, P.; McCarthy, T. J. *J. Am. Chem. Soc.* 2012, 134, 2024.
(13) He, L.; Fullenkamp, D. E.; Rivera, J. G.; Messersmith, P. B. *Chem. Commun.* 2011, 47, 7497.
(14) Chen, X.; Dam, M. A.; Ono, K.; Mal, A.; Shen, H.; Nut, S. R.; Sheran, K.; Wudl, F. *Science* 2002, 295, 1698.
(15) Herbst, F.; Doehler, D.; Michael, P.; Binder, W. H. *Macromol. Rapid Commun.* 2013, 34, 203.
(16) Burnworth, M.; Tang, L.; Kumpfer, J. R.; Duncan, A. J.; Beyer, F. L.; Fiore, G. L.; Rowan, S. J.; Weder, C. *Nature* 2011, 472, 334.
(17) Bode, S.; Zedler, L.; Schacher, F. H.; Dietzek, B.; Schmitt, M.; Popp, J.; Hager, M. D.; Schubert, U. S. *Adv. Mater.* 2013, 25, 1634.
(18) Nakahata, M.; Takashima, Y.; Yamaguchi, H.; Harada, A. *Nat. Commun.* 2011, 2, 1521/1.
(19) Burattini, S.; Greenland, B. W.; Merino, D. H.; Weng, W.; Seppala, J.; Colquhoun, H. M.; Hayes, W.; Mackay, M. E.; Hamley, I. W.; Rowan, S. J. *J. Am. Chem. Soc.* 2010, 132, 12051.
(20) Kalista, S. J., Jr.; Ward, T. C.; Oyetunji, Z. *Mech. Adv. Mater. Struct.* 2007, 14, 391.
(21) Cordier, P.; Tournilhac, F.; Soulie-Ziakovic, C.; Leibler, L. *Nature* 2008, 451, 977.
(22) Aida, T.; Meijer, E. W.; Stupp, S. I. *Science* 2012, 335, 813.
(23) Hentschel, J.; Kushner, A. M.; Ziller, J.; Guan, Z. *Angew. Chem., Int. Ed.* 2012, 51, 10561.
(24) Mozhdehi, D.; Ayala, S.; Cromwell, O. R.; Guan, Z. *J. Am. Chem. Soc.* 2014, 136, 16128.
(25) Chen, Y.; Kushner, A. M.; Williams, G. A.; Guan, Z. *Nat. Chem.* 2012, 4, 467.
(26) Moad, G.; Rizzardo, E.; Thang, S. H. *Aust. J. Chem.* 2009, 62, 1402.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

Unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

What is claimed is:

1. A self-healing polymer material comprising a multiphase copolymer comprising one or more hydrogen bond-forming copolymer segments, each hydrogen bond-forming copolymer segment comprising a polymerized acrylamide monomer and a polymerized acrylic monomer, the polymerized acrylic monomer being a methacrylate monomer or an acrylate monomer, or a combination thereof, wherein the polymerized acrylamide monomer comprises functional groups that form hydrogen bonds in the multiphase copolymer, and wherein the multiphase copolymer further comprises polymerized styrenic segments forming glassy domains in the multiphase copolymer.

2. The polymer material of claim 1, wherein the multiphase copolymer is a branched copolymer.

3. The polymer material of claim 2, wherein the branched copolymer is a graft or brush copolymer comprising the one or more hydrogen bond-forming copolymer segments attached to a polymer backbone, or is a star copolymer comprising the one or more hydrogen bond-forming copolymer segments attached to a core.

4. The polymer material of claim 1, wherein the polymerized styrenic segments are formed from a styrenic monomer selected from the group consisting of styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, 2-vinylnaphthalene, a halogenated styrene, an alkoxystyrene, or a vinylbenzoate ester, and combination thereof.

5. The polymer material of claim 1, wherein the acrylic monomer of the hydrogen bond-forming copolymer segments is butyl acrylate, methyl methacrylate, methyl acrylate, ethyl acrylate, ethyl methacrylate, or butyl methacrylate, isobutyl acrylate, 2-ethylhexyl acrylate, 2-methlxyethyl acrylate, 2-hydroxyethyl acrylate, dimethylaminoethyl acrylate, tetrahydrofurfryl acrylate, 2-ethylhexyl methacrylate, isodecyl methacrylate, n-lauryl methacrylate, n-stearyl methacrylate, 2-hydroxymethyl methacrylate, or 2-hydroxypropyl methacrylate, or a combination thereof.

6. A self-healing polymer material comprising a multiphase copolymer comprising one or more hydrogen bond-forming copolymer segments, each segment comprising a polymerized acrylamide monomer and a polymerized acrylic monomer, the polymerized acrylic monomer being a methacrylate monomer or an acrylate monomer, or a combination thereof, wherein the polymerized acrylamide monomer comprises functional groups that form hydrogen bonds in the multiphase copolymer, and wherein the multiphase copolymer is a branched copolymer.

7. The polymer material of claim 6, wherein the branched copolymer is a graft or brush copolymer comprising the one or more hydrogen bond-forming copolymer segments attached to a polymer backbone, or is a star copolymer comprising the one or more hydrogen bond-forming copolymer segments attached to a core.

8. The polymer material of claim 6, wherein the multiphase copolymer comprises polymerized styrenic monomer segments or polymerized acrylic monomer segments forming glassy domains in the multiphase copolymer.

9. The polymer material of claim 8, wherein the polymerized styrenic monomer segments are formed from a styrenic monomer selected from the group consisting of styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, 2-vinylnaphthalene, a halogenated styrene, an alkoxystyrene, or a vinylbenzoate ester, and combinations thereof.

10. The polymer material of claim 9, wherein the acrylic monomer of the polymerized acrylic monomer segments is a methacrylate monomer or an acrylate monomer, or a combination thereof.

11. The polymer material of claim 10, wherein the acrylic monomer of the polymerized acrylic monomer segments is butyl acrylate, methyl methacrylate, methyl acrylate, ethyl acrylate, ethyl methacrylate, butyl methacrylate, isobutyl methacrylate, tert-butyl methacrylate, cyclohexyl methacrylate, dicyclopentanyl methacrylate, benzyl methacrylate, or isobornyl methacrylate, or a combination thereof.

12. The polymer material of claim 6, wherein the acrylic monomer of the hydrogen bond-forming copolymer segments is butyl acrylate, methyl methacrylate, methyl acrylate, ethyl acrylate, ethyl methacrylate, or butyl methacrylate, isobutyl acrylate, 2-ethylhexyl acrylate, 2-methlxyethyl acrylate, 2-hydroxyethyl acrylate, dimethylaminoethyl acrylate, tetrahydrofurfryl acrylate, 2-ethylhexyl methacrylate, isodecyl methacrylate, n-lauryl methacrylate, n-stearyl methacrylate, 2-hydroxymethyl methacrylate, or 2-hydroxypropyl methacrylate, or a combination thereof.

* * * * *